United States Patent
Osuka et al.

(10) Patent No.: US 9,126,589 B2
(45) Date of Patent: Sep. 8, 2015

(54) MANUAL TRANSMISSION

(75) Inventors: Shinya Osuka, Nishio (JP); Yuki Masui, Okazaki (JP)

(73) Assignee: Aisin AI Co., Ltd., Nishio-Shi (JP)

( * ) Notice: Subject to any disclaimer, the term of this patent is extended or adjusted under 35 U.S.C. 154(b) by 69 days.

(21) Appl. No.: 13/992,261

(22) PCT Filed: Mar. 1, 2012

(86) PCT No.: PCT/JP2012/055215
§ 371 (c)(1),
(2), (4) Date: Aug. 5, 2013

(87) PCT Pub. No.: WO2012/124492
PCT Pub. Date: Sep. 20, 2012

(65) Prior Publication Data
US 2013/0333517 A1    Dec. 19, 2013

(30) Foreign Application Priority Data
Mar. 11, 2011 (JP) .................. 2011-053756

(51) Int. Cl.
 *B60W 20/00* (2006.01)
 *B60K 6/40* (2007.10)
 (Continued)

(52) U.S. Cl.
CPC .................. *B60W 20/30* (2013.01); *B60K 6/20* (2013.01); *B60K 6/40* (2013.01); *B60K 6/48* (2013.01);
(Continued)

(58) Field of Classification Search
CPC ...... B60K 6/20; B60K 6/40; B60K 2006/268; B60K 2006/4808; B60W 20/20; B60W 20/30; B60W 20/40; B60W 20/108; B60W 30/19; B60Y 2400/71; F16H 2063/3083; F16H 63/20; Y02T 10/6286

USPC .......... 74/335, 661, 665 A; 903/902; 477/15, 477/17, 20, 125; 701/22, 52–55, 62
See application file for complete search history.

(56) References Cited

U.S. PATENT DOCUMENTS 5,038,627 A    8/1991    Schwaiger et al.
6,295,487 B1    9/2001    Ono et al.
(Continued)

FOREIGN PATENT DOCUMENTS

EP    1 759 915 A2    3/2007
JP    04-228968 A1    8/1992
(Continued)

OTHER PUBLICATIONS

International Search Report and Written Opinion dated May 29, 2012.
(Continued)

*Primary Examiner* — William Kelleher
*Assistant Examiner* — Bobby Rushing, Jr.
(74) *Attorney, Agent, or Firm* — Burr & Brown, PLLC

(57) ABSTRACT

This transmission include an input shaft to which power is input from an internal combustion engine and an output shaft to which power is input from an electric motor. This transmission has a gear stage (EV) for EV travel (different from the neutral) in which no power transmission system is established between the input and output shafts, and a plurality of gear stages (1-st to 5-th) for HV travel in which a power transmission system is established between the input and output shafts. "1-st" is used in place of "EV" so as to start a vehicle only when EV travel cannot be performed normally. On an H pattern, a "shift completion position for EV" is disposed at a position through which a shift operation member passes during a "shift operation" (operation in the front-rear direction of the vehicle) from a "1-2 selection position" to a "shift completion position for 1-st."

6 Claims, 20 Drawing Sheets

(51) Int. Cl.
- *B60K 6/20* (2007.10)
- *B60K 6/48* (2007.10)
- *B60K 6/547* (2007.10)
- *F16H 63/20* (2006.01)
- *B60W 10/06* (2006.01)
- *B60W 10/08* (2006.01)
- *B60W 10/11* (2012.01)
- *B60W 30/19* (2012.01)
- *B60K 6/26* (2007.10)
- *F16H 3/089* (2006.01)
- *F16H 63/30* (2006.01)

(52) U.S. Cl.
CPC .............. *B60K 6/547* (2013.01); *B60W 10/06* (2013.01); *B60W 10/08* (2013.01); *B60W 10/11* (2013.01); *B60W 20/108* (2013.01); *B60W 20/20* (2013.01); *B60W 30/19* (2013.01); *F16H 63/20* (2013.01); *B60K 2006/268* (2013.01); *B60K 2006/4808* (2013.01); *B60W 20/40* (2013.01); *B60Y 2400/71* (2013.01); *F16H 3/089* (2013.01); *F16H 2063/3083* (2013.01); *Y02T 10/626* (2013.01); *Y02T 10/6221* (2013.01); *Y02T 10/6286* (2013.01); *Y10S 903/902* (2013.01); *Y10T 74/19014* (2015.01)

(56) References Cited

U.S. PATENT DOCUMENTS

| | | | |
|---|---|---|---|
| 6,997,074 B2 * | 2/2006 | Wadas et al. | 74/335 |
| 8,556,772 B2 * | 10/2013 | Biallas | 477/115 |
| 2014/0011630 A1 * | 1/2014 | Takahashi | 477/4 |

FOREIGN PATENT DOCUMENTS

| | | |
|---|---|---|
| JP | 2000-224710 A1 | 8/2000 |
| JP | 2010-254014 | 11/2010 |
| WO | 00/05094 A1 | 2/2000 |

OTHER PUBLICATIONS

Extended European Search Report (Application No. 12758274) dated May 13, 2015.

* cited by examiner

N POSITION

POSITION FOR EV

POSITION FOR 1-ST

POSITION FOR 2-ND

POSITION FOR 3-RD

POSITION FOR 4-TH

POSITION FOR 5-TH

MANUAL TRANSMISSION

TECHNICAL FIELD

The present invention relates to a manual transmission applied to a vehicle which has an internal combustion engine and an electric motor as power sources, and more particularly to a manual transmission applied to a vehicle which includes a friction clutch disposed between the output shaft of the internal combustion engine and the input shaft of the manual transmission.

BACKGROUND ART

Conventionally, there has been widely known a so-called hybrid vehicle which includes an engine and an electric motor as power sources (see, for example, Japanese Patent Application Laid-Open (kokai) No. 2000-224710). In such a hybrid vehicle, there can be employed a structure in which the output shaft of the electric motor is connected to one of the output shaft of the internal combustion engine, the input shaft of a transmission, and the output shaft of the transmission. In the following description, drive torque from the output shaft of the internal combustion engine will be referred to as "engine drive torque," and drive torque from the output shaft of the electric motor as "motor drive torque."

In recent years, there has been developed a power transmission control apparatus applied to a hybrid vehicle which includes a manual transmission and a friction clutch (hereinafter referred to as an "HV-MT vehicle"). The term "manual transmission" used herein refers to a transmission which does not include a torque converter and whose gear stage is selected in accordance with the shift position of a shift lever operated by a driver (the manual transmission is denoted by MT). Also, the term "friction clutch" used herein refers to a clutch which is interposed between the output shaft of the internal combustion engine and the input shaft of the manual transmission and which is configured such that the engagement state of a friction plate changes in accordance with the operation quantity of a clutch pedal operated by the driver.

SUMMARY OF THE INVENTION

A hybrid vehicle can realize a state in which the vehicle travels by utilizing engine drive torque and motor drive torque (hereinafter referred to as "HV travel"). In recent years, there has been developed a hybrid vehicle which can realize not only such HV travel but also a state in which the vehicle travels by utilizing only the motor drive torque, while maintaining the internal combustion engine in a stopped state (a state in which the rotation of the output shaft of the internal combustion engine stops) (hereinafter referred to as "EV travel").

In order to enable an HV-MT vehicle to realize EV travel in a state in which a driver does not operate a clutch pedal (namely, in a state in which the clutch of the vehicle is engaged), it is necessary to drive the output shaft of the transmission by utilizing motor drive torque while maintaining a state in which the input shaft of the transmission does not rotate. In order to realize this, it is necessary to connect the output shaft of the electric motor to the output shaft of the transmission and to maintain the transmission in a "state in which no power transmission system is established between the input shaft of the transmission and the output shaft of the transmission."

Here, there is assumed a manual transmission which has an "input shaft to which power is input from an internal combustion engine (through a clutch)" and an "output shaft to which power is input from an electric motor (namely, to which the output shaft of the electric motor is always connected in a power transmissible manner)." In this manual transmission, motor drive torque can be arbitrarily transmitted to the output shaft of the manual transmission (accordingly, to drive wheels) irrespective of whether or not a power transmission system is established between the input shaft and the output shaft.

Accordingly, in order to realize not only HV travel but also the above-mentioned EV travel by utilizing such a manual transmission, the manual transmission must have not only "gear stages in which a power transmission system is established between the input shaft and the output shaft" for HV travel (hereinafter referred to as "gear stages for HV travel") but also a "gear stage in which no power transmission system is established between the input shaft and the output shaft" for EV travel (gear stage different from the neutral) (hereinafter referred to as a "gear stage for EV travel").

Namely, in this manual transmission, when the shift lever is moved on a shift pattern to one of shift completion positions corresponding to a plurality of gear stages for HV travel, a power transmission system having a "speed reduction ratio" corresponding to the corresponding gear stage for HV travel is established between the input shaft and the output shaft, and when the shift lever is moved on the shift pattern to a shift completion position (different from the neutral position) corresponding to the gear stage for EV travel, no power transmission system is established between the input shaft and the output shaft.

Incidentally, in general, a so-called "H pattern" is employed for a manual transmission as a shift pattern of the shift lever. Namely, in order to establish a certain one of a plurality of gear stages, the shift lever is moved to a corresponding selection position by a selection operation (operation in the left-right direction of the vehicle) of the shift lever, and is then moved from the corresponding selection position to a corresponding shift completion position by a shift operation (operation in the front-rear direction of the vehicle) of the shift lever.

EV travel is mainly used at the time of low-speed travel, for example, at the time of starting the vehicle. In other words, the gear stage for EV travel corresponds to "1-st" (gear stage which is greatest in speed reduction ratio) among the gear stages for HV travel. In order to enable smooth start of the vehicle even when EV travel cannot be performed normally, both the "gear stage for EV travel" and the "gear stage corresponding for 1-st" may be provided. This enables a driver to start the vehicle by using the "gear stage for EV travel"; i.e., utilizing motor drive torque, when EV travel can be performed normally, and enables the driver to start the vehicle by using the "gear stage for 1-st"; i.e., utilizing engine drive torque, when EV travel cannot be performed normally.

In the case where an H pattern is employed as a shift pattern and both the "gear stage for EV travel" and the "gear stage for 1-st" are provided, a manner of disposing their shift completion positions is very important. In the "gear stage for 1-st," like other gear stages for HV travel (e.g., 2-nd, 3-rd, etc.), a power transmission system must be established between the input and output shafts of the transmission. Therefore, preferably, the shift completion position for "1-st" is disposed on the H pattern.

From this point of view, for example, the shift completion position for "1-st" must be provided on the H pattern, and the shift completion position for "EV" must be provided at a position located outside the H pattern as shown in FIG. 20. However, in this case, when a drive operates the shift lever, he or she may become confused.

An object of the present invention is to provide a manual transmission for an HV-MT vehicle which includes an "input shaft to which power is input from an internal combustion engine (through a friction clutch)" and an "output shaft to which power is input from an electric motor," which has a plurality of gear stages (for HV travel) and a "gear stage for EV travel," which employs an H pattern as a shift pattern, and which prevents a driver from becoming confused in operation of a shift operation member.

The feature of a manual transmission according to the present invention resides in that, on an H pattern, a shift completion position corresponding to a gear stage for EV travel is disposed at a position through which a shift operation member passes during a "shift operation" (operation in the front-rear direction of a vehicle) from a selection position corresponding to "1-st" to a shift completion position for "1-st."

As a result, when the gear stage for EV travel is established, like the case where "1-st" is established, a driver merely moves the shift operation member to the selection position corresponding to "1-st" by a "selection operation" (operation in the left-right direction of the vehicle) and then moves the shift operation member from the selection position corresponding to "1-st" to a shift completion position for "1-st" by a "shift operation." Accordingly, the driver is less likely to become confused in the operation of the shift operation member.

In the manual transmission according to the present invention, preferably, the transmission speed change mechanism includes a lock mechanism (G). The lock mechanism is a mechanism which selectively realizes a "lock state" or an "unlock state." The lock mechanism can select, as a state to be realized, the "lock state" or the "unlock state" in accordance with an operation of a driver. The "lock state" refers to a state in which when a "shift operation" from the "selection position corresponding to 1-st" toward the "shift completion position for 1-st" is performed, the shift operation member can move from the "selection position corresponding to 1-st" to the "shift completion position corresponding to the gear stage for EV travel" but cannot move from the "shift completion position corresponding to the gear stage for EV travel" to the "shift completion position for 1-st." The "unlock state" refers to a state in which when the "shift operation" from the "selection position corresponding to 1-st" toward the "shift completion position for 1-st" is performed, the shift operation member can move from the "selection position corresponding to 1-st" to the "shift completion position for 1-st" (through the "shift completion position corresponding to the gear stage for EV travel").

By virtue of the above-described configuration, when the driver determines that EV travel is performed normally, the driver can select the "lock state." As a result, it is possible to prevent arising of a situation in which when the driver tries to move the shift operation member from the "selection position corresponding to 1-st" to the "shift completion position for the gear stage for EV travel" so as to, for example, start the vehicle, the driver accidentally moves the shift operation member from the "selection position corresponding to 1-st" to the "shift completion position for 1-st." Meanwhile, in the case where the driver determines that EV travel cannot be performed normally, the driver can select the "unlock state." As a result, at the time of, for example, starting the vehicle, the driver can move the shift operation member from the "selection position corresponding to 1-st" to the "shift completion position for 1-st" without fail.

Notably, the manual transmission of the present invention includes a plurality of fixed gears (G1$i$, G2$i$, G3$i$, G4$i$, G5$i$) non-rotatably provided on the input shaft or the output shaft and corresponding to the plurality of gear stages; a plurality of idle gears (G1$o$, G2$o$, G3$o$, G4$o$, G5$o$) rotatably provided on the input shaft or the output shaft, corresponding to the plurality of gear stages, and always meshing with the fixed gears of the corresponding gear stages; a plurality of sleeves (S1, S2, S3) provided on corresponding one of the input shaft and the output shaft such that the sleeves cannot rotate in relation to the corresponding shaft and can axially move in relation to the corresponding shaft, each of the sleeves being capable of engaging with a corresponding one of the plurality of idle gears so as to non-rotatably fix the corresponding idle gear to the corresponding shaft; and a plurality of fork shafts (FS1, FS2, FS3) respectively connected to the plurality of sleeves and being movable in the axial direction. A "specific sleeve" which will be described later is one of the plurality of sleeves, and a "specific fork shaft" which will be described later is one of the plurality of fork shafts.

MODE FOR CARRYING OUT THE INVENTION

Figure 1:
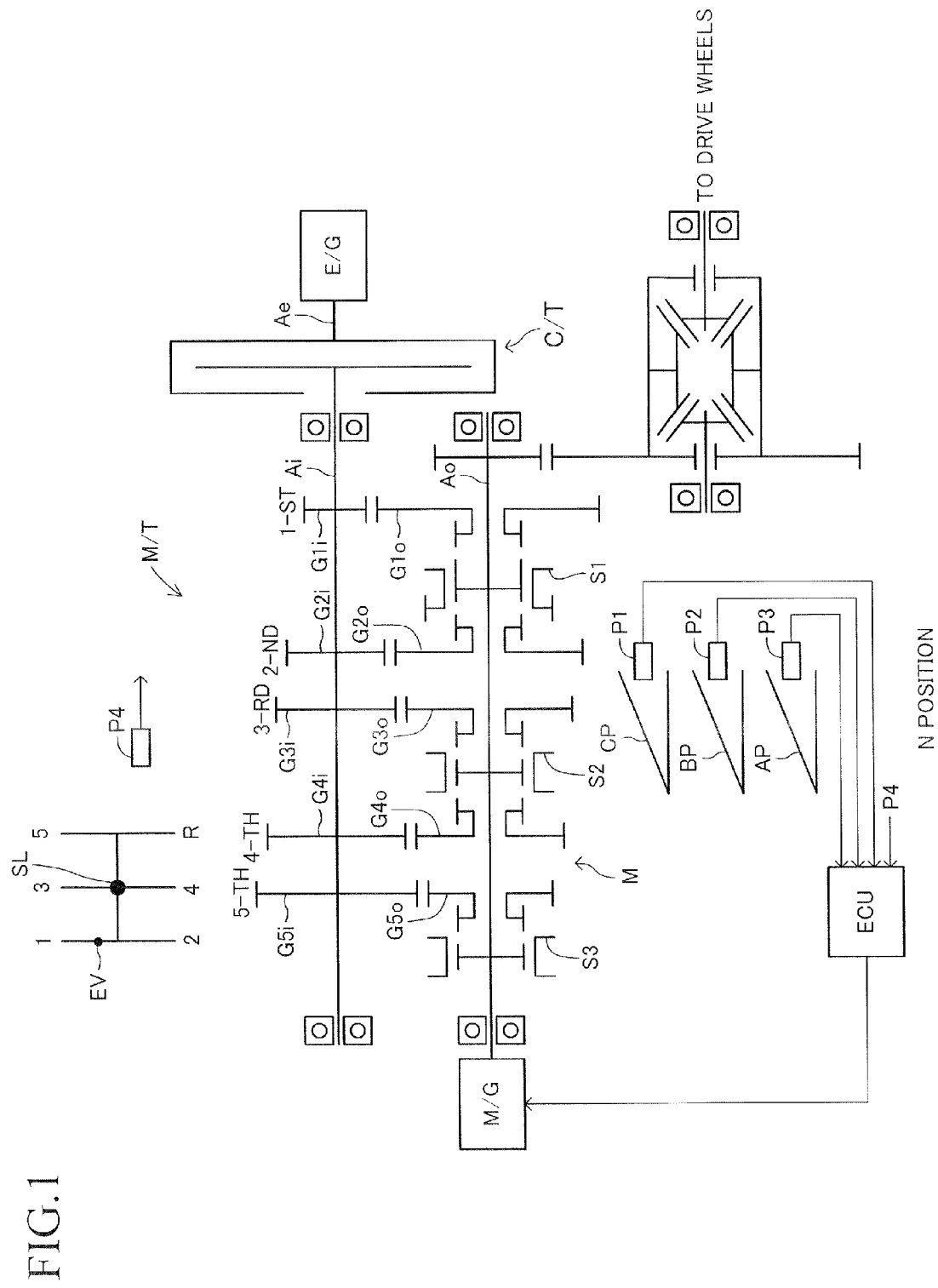
FIG. 1 is a schematic diagram of a power transmission control apparatus which includes a manual transmission for an HV-MT vehicle according to an embodiment of the present invention in a state in which an N position is selected.

An example of a power transmission control apparatus of a vehicle which includes a manual transmission M/T according to an embodiment of the present invention (hereinafter referred to as the "present apparatus") will now be described with reference to the drawings. As shown in FIG. 1, the present apparatus is applied to a "vehicle which includes an engine E/G and a motor generator M/G as power sources, and also includes a manual transmission M/T, which does not include a torque converter, and a friction clutch C/T"; i.e., the above-described "HV-MT vehicle." This "HV-MT vehicle" may be a front wheel drive vehicle, a rear wheel drive vehicle, or a four wheel drive vehicle.

(Overall Structure)

First, the overall structure of the present apparatus will be described. The engine E/G is a well known internal combustion engine, such as a gasoline engine which uses gasoline as fuel, or a diesel engine which uses light oil as fuel.

The manual transmission M/T is a transmission which does not include a torque converter and whose gear stage is selected in accordance with the shift position of a shift lever SL operated by a driver. The manual transmission M/T has an input shaft Ai to which power is input from an output shaft Ae of the engine E/G, and an output shaft Ao to which power is input from the motor generator M/G and from which power is output to drive wheels of the vehicle. The input shaft Ai and the output shaft Ao are disposed parallel with each another. The output shaft Ao may be the output shaft of the motor generator M/G itself or a shaft which is parallel to the output shaft of the motor generator M/G and is always connected to the output shaft of the motor generator M/G in a power transmissible manner through a gear train. The details of the structure of the manual transmission M/T will be described later.

The friction clutch C/T is disposed between the output shaft Ae of the engine E/G and the input shaft Ai of the manual transmission M/T. The friction clutch C/T is a well known clutch configured such that the engagement state of a friction plate (more specifically, the axial position of a friction plate, which rotates together with the input shaft Ai, in relation to a fly-wheel, which rotates together with the output shaft Ae) changes in accordance with an operation quantity (depression amount) of a clutch pedal CP operated by the driver.

The engagement state of the friction clutch C/T (the axial position of the friction plate) may be mechanically adjusted in accordance with the operation quantity of the clutch pedal CP, by making use of a link mechanism or the like which mechanically connects the clutch pedal CP to the friction clutch C/T (the friction plate). Alternatively, the engagement state of the friction clutch C/T may be electrically adjusted by making use of drive force of an actuator which operates in accordance with the result of detection by a sensor (a sensor P1 to be described later) which detects the operation quantity of the clutch pedal CP (by a so-called by-wire scheme).

The motor generator M/G has a well known structure (e.g., an AC synchronous motor), and its rotor (not illustrated) rotates together with the output shaft Ao. Namely, a power transmission system is always established between the output shaft of the motor generator M/G and the output shaft Ao of the manual transmission M/T. In the following description, drive torque from the output shaft Ae of the engine E/G will be referred to as "EG torque," and drive torque from the output shaft of the motor generator M/G (output shaft Ao) as "MG torque."

The present apparatus includes a clutch operation quantity sensor P1 which detects the operation quantity (depression amount, clutch stroke, etc.) of the clutch pedal CP, a brake operation quantity sensor P2 which detects the operation quantity (depression force, presence/absence of operation, etc.) of a brake pedal BP, an accelerator operation quantity sensor P3 which detects the operation quantity (accelerator opening) of an accelerator pedal AP, and a shift position sensor P4 which detects the position of the shift lever SL.

Moreover, the present apparatus includes an electronic control unit (hereinafter simply referred to as the "ECU"). On the basis of information, among others, from the above-mentioned sensors P1 to P4 and other sensors, etc., the ECU controls the EG torque by controlling the fuel injection amount of the engine E/G (opening of its throttle valve) and controls the MG torque by controlling an inverter (not shown).

(Structure of the Manual Transmission M/T)

The structure of the manual transmission M/T will be described specifically with reference to FIGS. 1 to 5. As can be understood from the shift pattern of the shift lever SL shown in FIG. 1 and FIG. 5, in the present example, six forward gear stages (EV, 1-st through 5-th) and a single reverse gear stage (R) are provided as selectable gear stages (shift completion positions). In the below, description regarding the reverse gear stage (R) is not provided. "EV" is the above-described gear stage for EV travel, and "1-st" through "5-th" are the above-described gear stages for HV travel. However, "1-st" is a gear stage for emergency which is used instead of "EV" so as to start the vehicle when EV travel cannot be performed normally, and is not used in an ordinary state.

Figure 5:
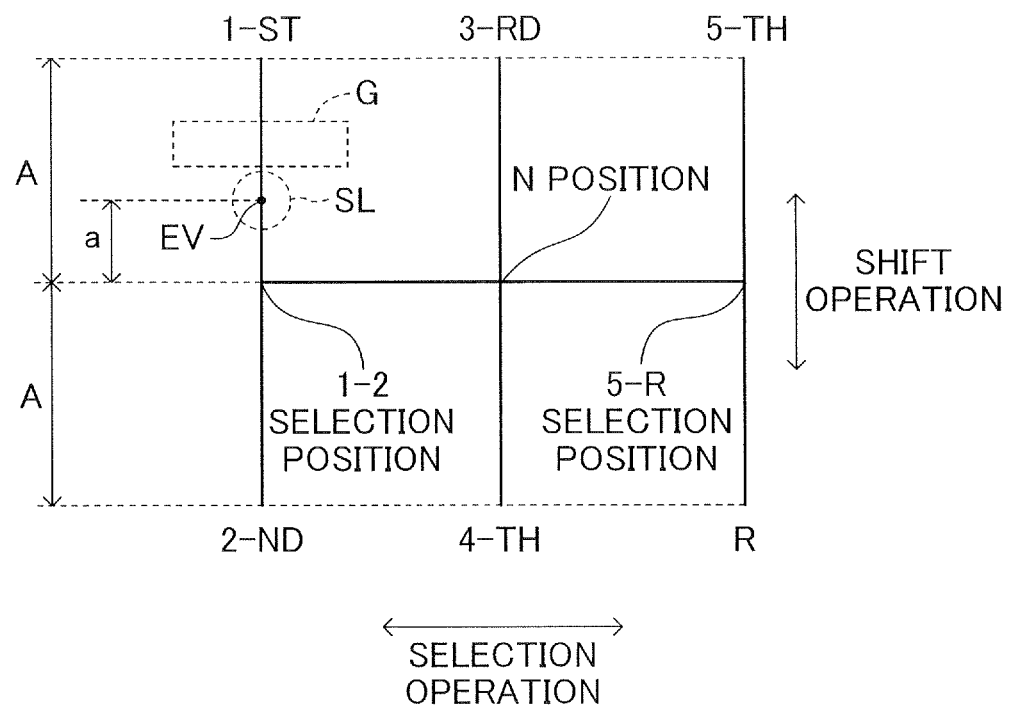
FIG. 5 is a diagram showing the detail of the shift pattern.

As shown in FIG. 5, a so-called "H pattern" is used as a shift pattern of the shift lever SL. On the shift pattern, the shift completion positions for "1-st" and "2-nd" are located at a distance A from a 1-2 selection position in the direction of the shift operation (the front-rear direction of the vehicle), the shift completion positions for "3-rd" and "4-th" are located at the distance A from an N position in the direction of the shift operation, and the shift completion position for "5-th is located at the distance A from a 5-R selection position in the direction of the shift operation. Meanwhile, the shift completion position for "EV" is located at a position deviated from the 1-2 selection position toward the front side of the vehicle by a distance a (A>a). In the following, in order to facilitate description, a range of shift position corresponding to a selection operation range including the "N position," the "1-2 selection position," and the "5-R selection position" will be collectively referred to as a "neutral range."

As shown in FIG. 5, this manual transmission M/T includes a lock mechanism G. The lock mechanism G selectively realizes a "lock state" and an "unlock state." The "lock state" refers to a state in which when a shift operation from the "selection position for 1-st" toward the "shift completion position for 1-st" is performed, the shift lever SL can move from the "selection position for 1-st" to the "shift completion position for EV" but cannot move from the "shift completion position for EV" to the shift completion position for 1-st." The "unlock state" refers to a state in which when the shift operation from the "selection position for 1-st" toward the "shift completion position for 1-st" is performed, the shift lever SL can move from the "selection position for 1-st" to the shift completion position for 1-st (through the "shift completion position for EV").

A driver can select the "lock state" or the "unlock state" as a state to be realized by operating a predetermined operation member (switch or the like) provided in the compartment of the vehicle. When the driver determines that EV travel is performed normally, the driver can select the "lock state." As a result, it is possible to prevent arising of a situation in which when the driver tries to move the shift lever SL from the "selection position for 1-st" to the "shift completion position for EV" so as to, for example, start the vehicle, the driver accidentally moves the shift lever SL from the "selection position for 1-st" to the "shift completion position for 1-st." Meanwhile, in the case where the driver determines that EV travel cannot be performed normally, the driver can select the "unlock state." As a result, at the time of, for example, starting the vehicle, the driver can move the shift lever SL from the "selection position for 1-st" to the "shift completion position for 1-st" without fail. The lock mechanism G can be realized by utilizing one of known structures. The details of the structure of the lock mechanism G will not be described herein.

The manual transmission M/T includes sleeves S1, S2, and S3. The sleeves S1, S2, and S3 are a sleeve for "1-st-2-nd," a sleeve for "3-rd-4-th," and a sleeve for "5-th," which are fitted onto corresponding hubs which rotate together with the output shaft Ao such that the sleeves cannot rotate relative to the corresponding hubs but can move in the axial direction relative to the corresponding hubs. The sleeve S1 is integrally coupled with a fork shaft FS1 shown in FIGS. 2 and 3 (via a corresponding fork). The sleeves S2 and S3 are integrally coupled with fork shafts FS2 and FS3 shown in FIGS. 2 and 4 (via corresponding forks). The fork shafts FS1 to FS3 are disposed parallel to one another within the unillustrated housing of the manual transmission M/T.

The fork shaft FS1 (i.e., the sleeve S1) is driven in the axial direction (in the vertical direction in FIG. 2 and in the left-right direction in FIGS. 1 and 3) by a first inner lever IL1 (see FIGS. 2 and 3) integrally provided on an S&S shaft which moves as a result of operation of the shift lever SL. The fork shafts FS2 and FS3 (i.e., the sleeves S2 and S3) are driven in the axial direction (in the vertical direction in FIG. 2 and in the left-right direction in FIGS. 1 and 4) by a second inner lever IL2 (see FIGS. 2 and 4) integrally provided on the S&S shaft.

The S&S shaft is translated in the axial direction by a selection operation (operation in the left-right direction in FIGS. 1 and 5) of the shift lever SL, and is rotated about the axis thereof by a shift operation (operation in the vertical direction in FIGS. 1 and 5) of the shift lever SL (shift rotation type). The S&S shaft and the fork shafts FS1 to FS3 are disposed within the unillustrated housing of the manual transmission M/T such that the S&S shaft extends orthogonally to the fork shafts FS1 to FS3 without intersecting them.

Figure 3:
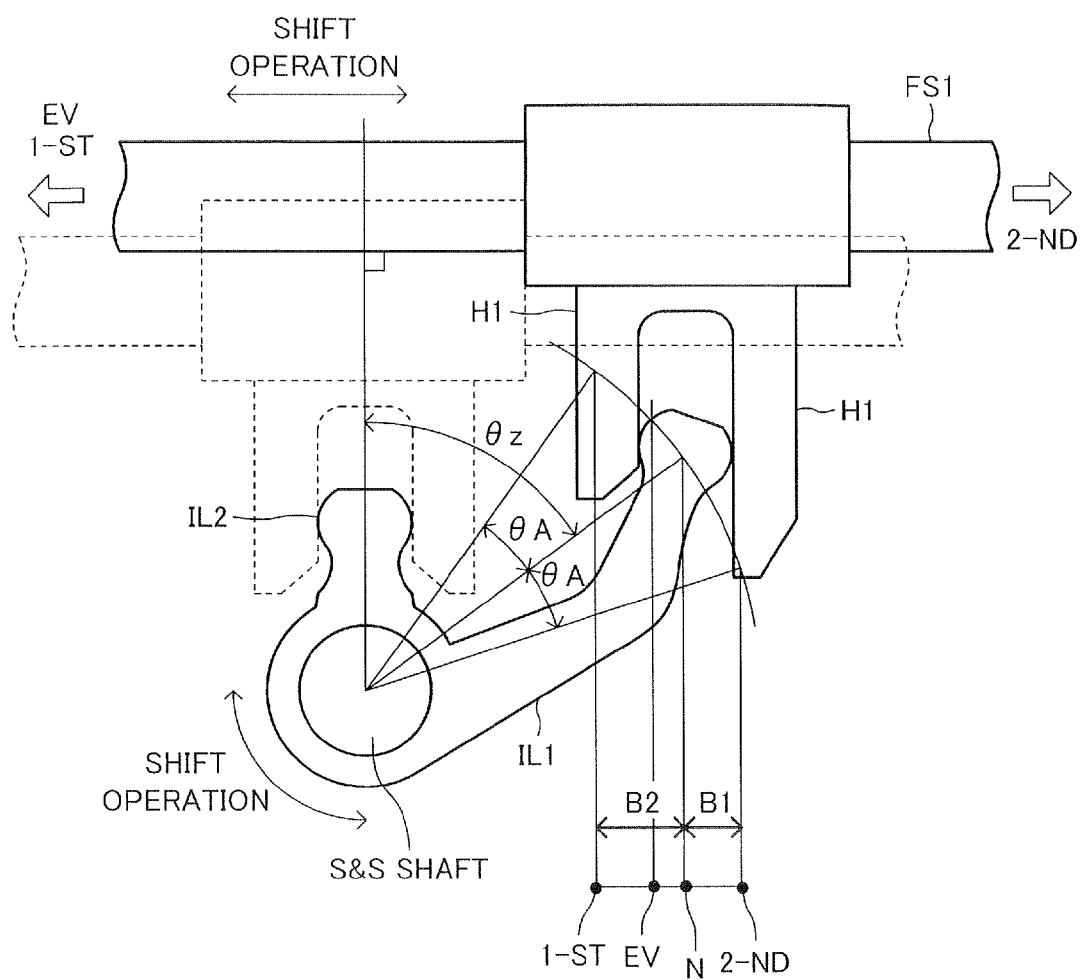
FIG. 3 is a schematic view showing the state of engagement between a "specific fork shaft" and a "specific inner lever."

FIG. 3 shows the rotational position of the S&S shaft when the shift lever SL is located within the neutral range (specifically, at the 1-2 selection position). In the following description, this rotational position will be referred to as a "reference position." As can be understood from FIG. 3, when viewed in the axial direction of the S&S shaft in a state in which the rotational position of the S&S shaft coincides with the reference position, an engagement portion of the inner lever IL1 is located on a "straight line which passes through the rotation center of the S&S shaft and inclines by a predetermined angle θz in relation to a perpendicular which extends from the rotation center toward the fork shaft FS1."

When the shift lever SL is located at the 1-2 selection position, the engagement portion of the inner lever IL1 can engage with a recess portion of a shift head H1 integrally connected to the fork shaft FS1. Thus, the engagement portion of the inner lever IL1 drives the fork shaft FS1 in the axial direction. In the following description, the axial position of the fork shaft FS1 at the time when the rotational position of the S&S shaft coincides with the reference position will be referred to as the "neutral position."

When the shift lever SL moves from the 1-2 selection position to the "shift completion position for 1-st" on the shift pattern (namely, moves toward the front side of the vehicle by the distance A), the rotational position of the S&S shaft moves from the reference position to a position (position for 1-st) deviated from the reference position by an angle θA in the counterclockwise direction in FIG. 3. As a result, the axial position of the fork shaft FS1 (i.e., the sleeve S1) moves to a position (position for 1-st) deviated from the neutral position by a distance B2 toward the left side in FIG. 3. Accordingly, when the shift lever SL moves from the 1-2 selection position to the "shift completion position for EV" (namely, moves toward the front side of the vehicle by the distance a), the axial position of the fork shaft FS1 (i.e., the sleeve S1) moves to a position (position for EV) deviated from the neutral position toward the left side in FIG. 3 by a "distance smaller than the distance B2." Meanwhile, when the shift lever SL moves from the 1-2 selection position to the "shift completion position for 2-nd" (namely, moves toward the rear side of the vehicle by the distance A), the rotational position of the S&S shaft moves from the reference position to a position (position for 2-nd) deviated from the reference position by the angle θA in the clockwise direction in FIG. 3. As a result, the axial position of the fork shaft FS1 (i.e., the sleeve S1) moves to a position (position for 2-nd) deviated from the neutral position by a distance B1 toward the right side in FIG. 3.

Here, a relation B2>B1 is satisfied. Namely, despite the fact that the rotation angle of the inner lever IL1 from the reference position in the case where the S&S shaft rotates in the counterclockwise direction is the same as that in the case where the S&S shaft rotates in the clockwise direction, the amount of axial movement of the fork shaft FS1 (i.e., the sleeve S1) in the former case differs from that in the latter case. This difference occurs because the engagement portion of the inner lever IL1 is located on a straight line which inclines from the "perpendicular" by the predetermined angle θz as described above. Of the sleeves S1 to S3, the sleeve S1 corresponds to the above-mentioned "specific sleeve"; of the fork shafts FS1 to FS3, the fork shaft FS1 corresponds to the above-mentioned "specific fork shaft"; and of the shift heads H1 to H3, the shift head H1 corresponds to the above-mentioned "specific shift head."

Figure 4:
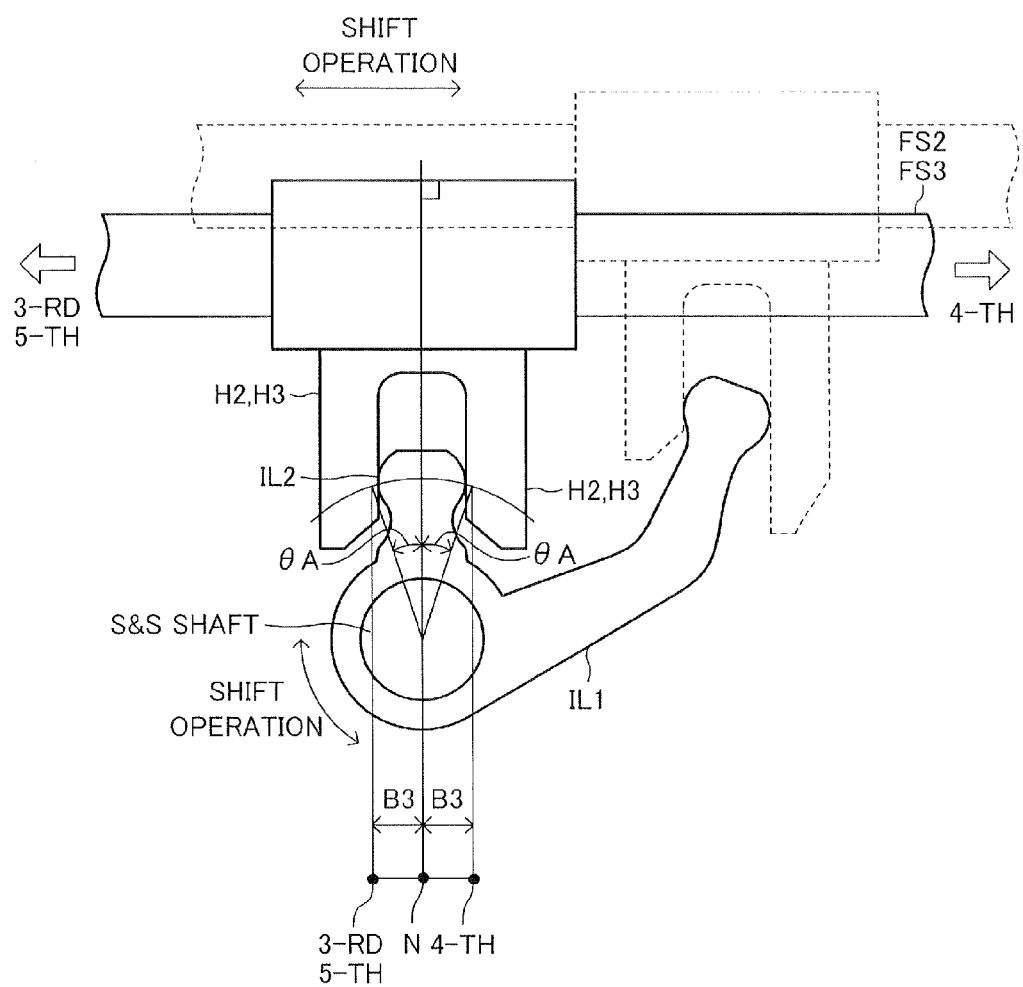
FIG. 4 is a schematic view showing the state of engagement between a fork shaft other than the "specific fork shaft" and an inner lever other than the "specific inner lever."

FIG. 4 shows the rotational position of the S&S shaft when the shift lever SL is located within the neutral range (specifically, at the N position or the 5-R selection position). This rotational position coincides with the above-mentioned "reference position." As can be understood from FIG. 4, when viewed in the axial direction of the S&S shaft in a state in which the rotational position of the S&S shaft coincides with the reference position, an engagement portion of the inner lever IL2 is located on a "perpendicular which extends from the rotation center of the S&S shaft toward the fork shaft FS2 (FS3)."

When the shift lever SL is located at the N position (5-R selection position), the engagement portion of the inner lever IL2 can engage with a recess portion of a shift head H2 (H3) integrally connected to the fork shaft FS2 (FS3). Thus, the engagement portion of the inner lever IL2 drives the fork shaft FS2 (FS3) in the axial direction. In the following description, the axial position of the fork shaft FS2 (FS3) at the time when the rotational position of the S&S shaft coincides with the reference position will be referred to as the "neutral position."

When the shift lever SL moves from the N position (5-R selection position to the "shift completion position for 3-rd (5-th)" on the shift pattern (namely, moves toward the front side of the vehicle by the distance A), the rotational position of the S&S shaft moves from the reference position to a position (position for 3-rd (5-th)) deviated from the reference position by an angle θA in the counterclockwise direction in FIG. 4. As a result, the axial position of the fork shaft FS2 (FS3) (i.e., the sleeve S2 (S3)) moves to a position (position for 3-rd (5-th)) deviated from the neutral position by a distance B3 toward the left side in FIG. 4. Meanwhile, when the shift lever SL moves from the N position to the "shift completion position for 4-th" (namely, moves toward the rear side of the vehicle by the distance A), the rotational position of the S&S shaft moves from the reference position to a position (position for 4-th) deviated from the reference position by the angle θA in the clockwise direction in FIG. 4. As a result, the axial position of the fork shaft FS2 (i.e., the sleeve S2) moves to a position (position for 4-th) deviated from the neutral position by the distance B3 toward the right side in FIG. 4.

As described above, in the case where the rotation angle of the inner lever IL2 from the reference position in the case where the S&S shaft rotates in the counterclockwise direction is the same as that in the case where the S&S shaft rotates in the clockwise direction, the amount of axial movement of the fork shaft FS2 (FS3) (i.e., the sleeve S2 (S3)) in the former case becomes equal to that in the latter case. This is because, as described above, the engagement portion of the inner lever IL2 is located on the above-mentioned "perpendicular." Next, the gear stages will be described one by one.

Figure 2:
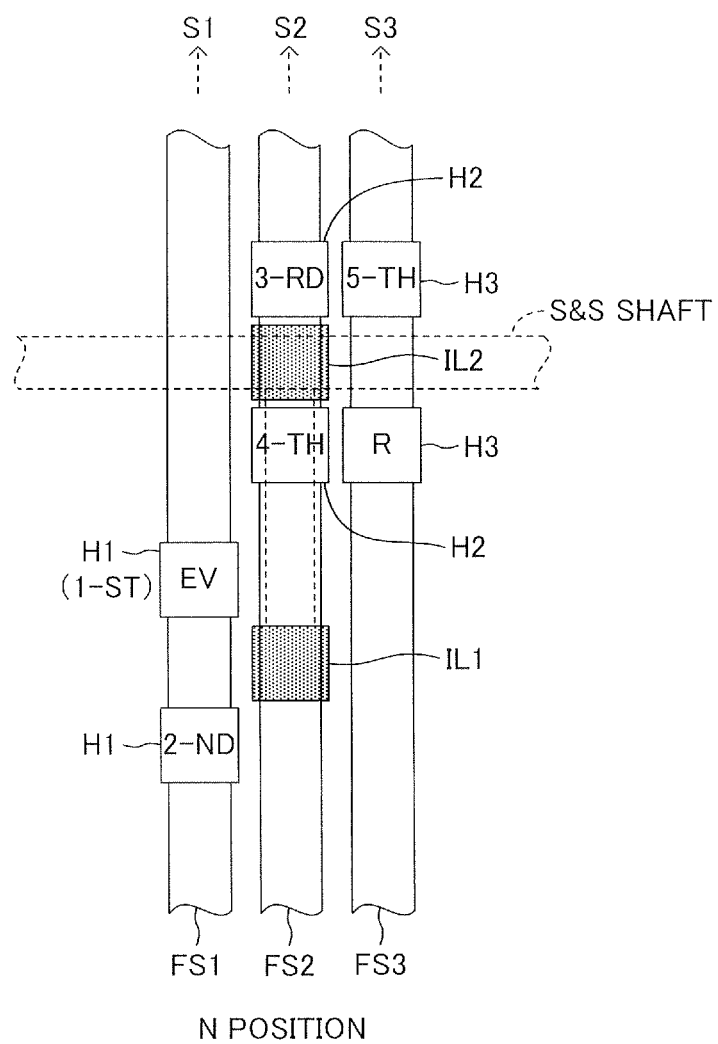
FIG. 2 is a schematic diagram showing the positional relation between an S&S shaft and a plurality of fork shafts in a state in which the N position is selected.

In a state in which the shift lever SL is located at the "N position" (more precisely, within the neutral range) as shown in FIGS. 1 and 2, all the sleeves S1, S2, and S3 are located at their "neutral positions." In this state, the sleeves S1, S2, and S3 do not engage with corresponding idle gears. Namely, no power transmission system is established between the input shaft Ai and the output shaft Ao.

Figure 6:
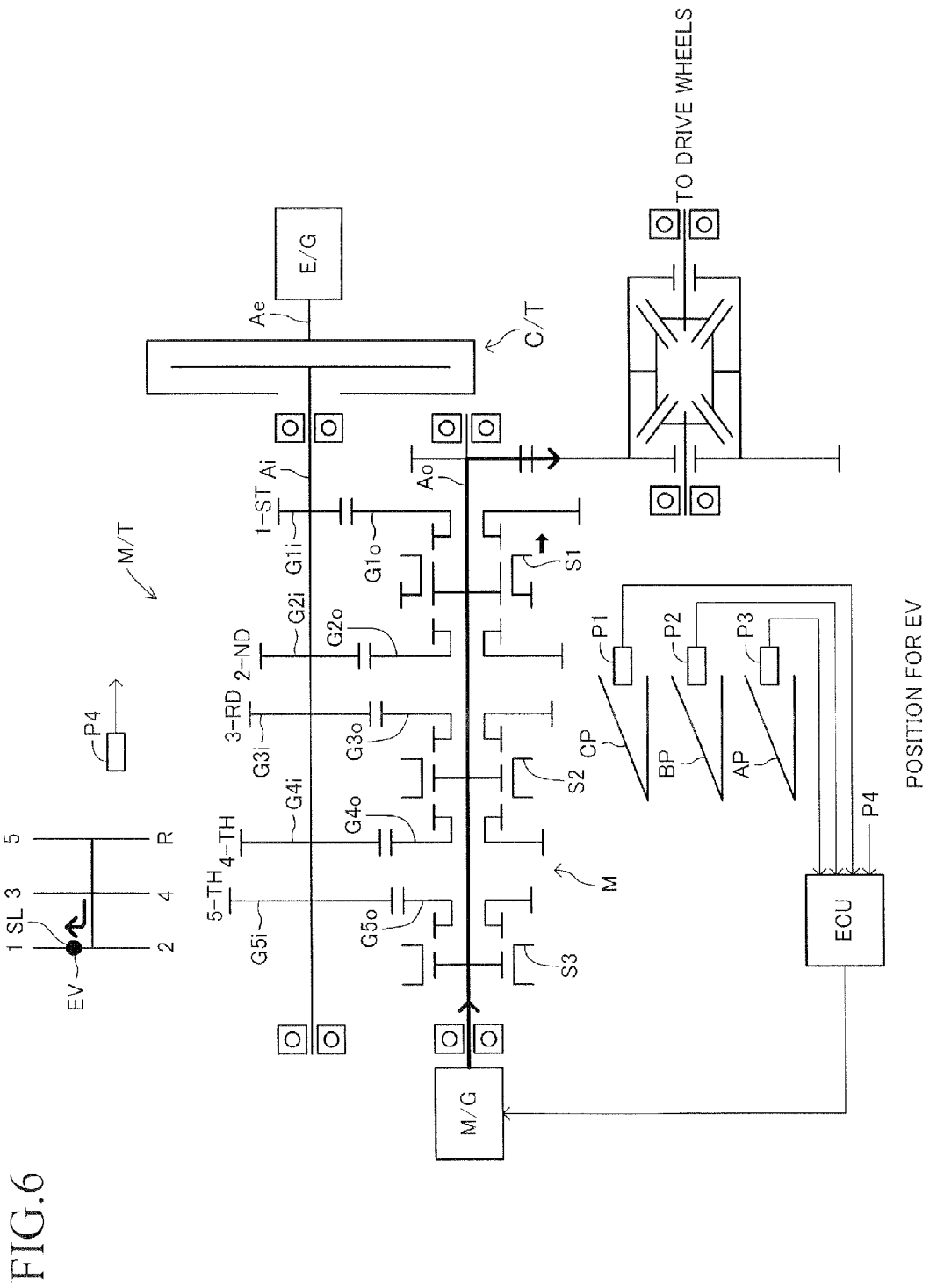
FIG. 6 is a diagram corresponding to FIG. 1 in a state in which a position for EV is selected.
Figure 7:
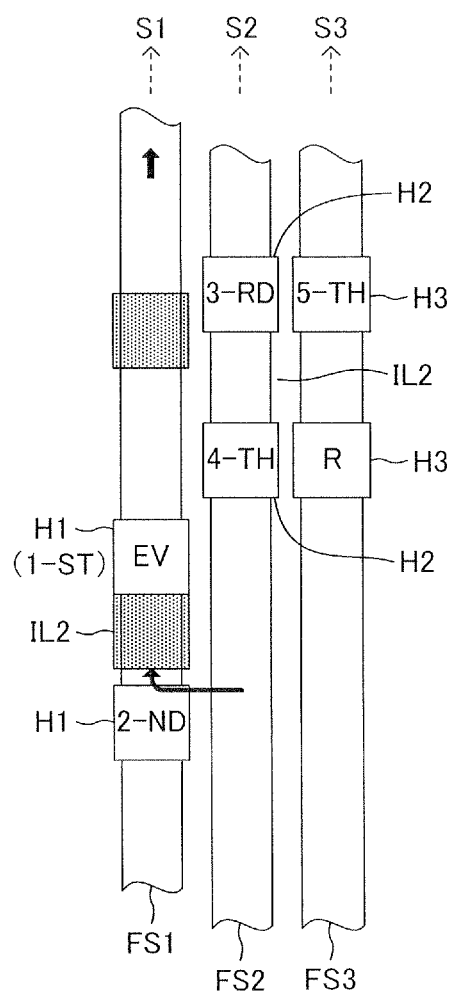
FIG. 7 is a diagram corresponding to FIG. 2 in a state in which the position for EV is selected.

When the shift lever SL moves from the "N position" to the "shift completion position for EV" (via the 1-2 selection position) (when the lock mechanism G is in the lock state) as shown in FIGS. 6 and 7, the inner lever IL1 of the S&S shaft drives an "EV-side engagement portion" of the shift head H1 connected to the fork shaft FS1 in the "EV" direction (upward in FIG. 7), whereby only the fork shaft FS1 (i.e., the sleeve S1) moves to the "position for EV." The sleeves S2 and S3 are located at the respective "neutral positions."

In this state, as shown in FIG. 6, the sleeve S1 does not engage with an idle gear G1o. Namely, as in the case where the shift lever SL is located at the "N position," no power transmission system is established between the input shaft Ai and the output shaft Ao. Accordingly, as indicated by a thick continuous line in FIG. 6, a power transmission system is established only between the motor generator M/G and the output shaft Ao. Namely, when "EV" is selected, there is realized a state (namely, the above-mentioned "EV travel") in which the vehicle travels by utilizing the MG torque only while maintaining the engine E/G in a stopped state (a state in which the rotation of the output shaft Ae of the engine E/G stops). Namely, in this vehicle, in the case where EV travel can be performed normally, the driver can start the vehicle by EV travel by selecting "EV." Notably, distinction between the "N position" (neutral range) and the "position for EV" can be made on the basis of, for example, the result of detection by the shift position sensor P4 and the result of detection by a sensor which detects the position of the S&S shaft.

Figure 8:
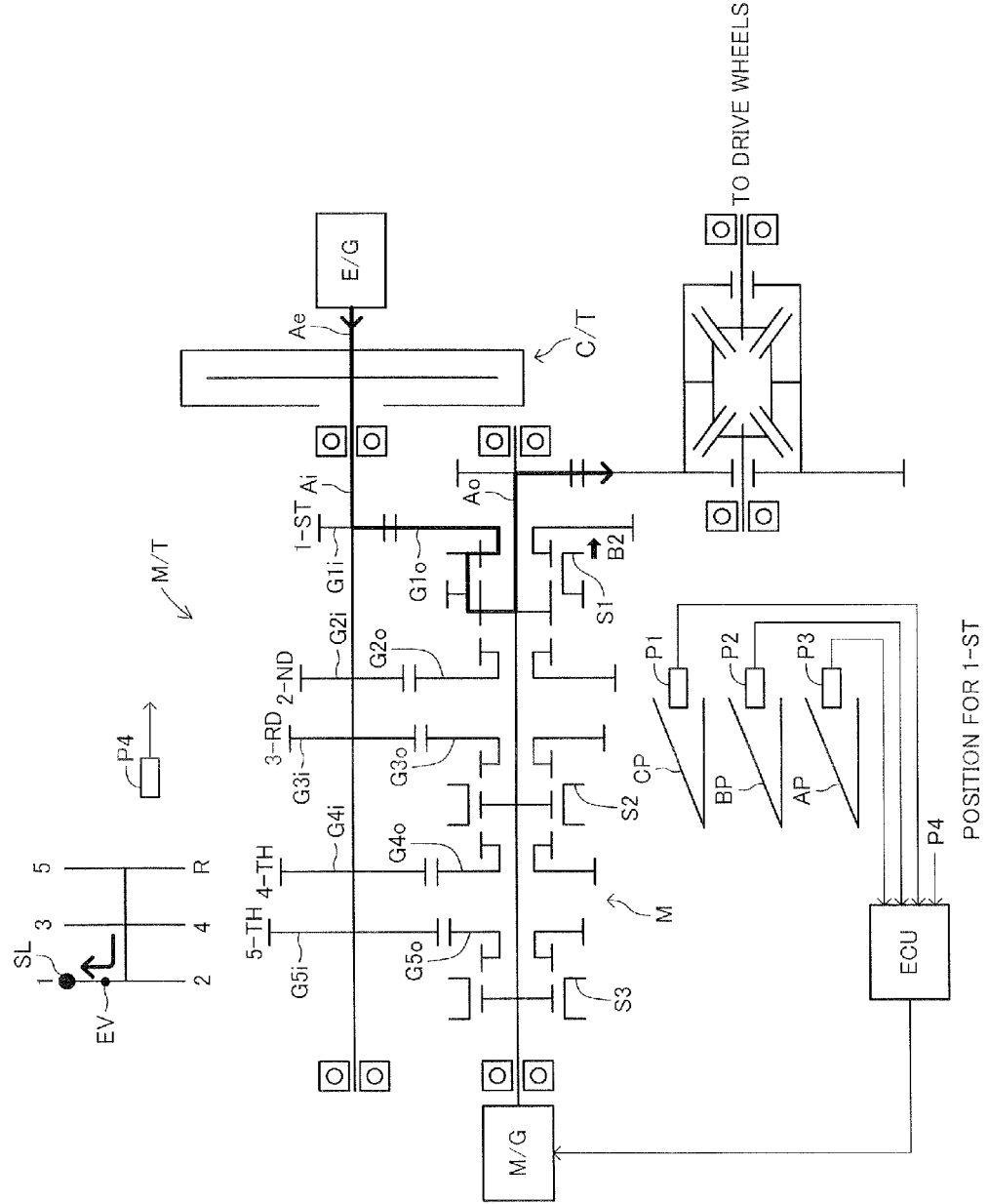
FIG. 8 is a diagram corresponding to FIG. 1 in a state in which a position for 1-st is selected.
Figure 9:
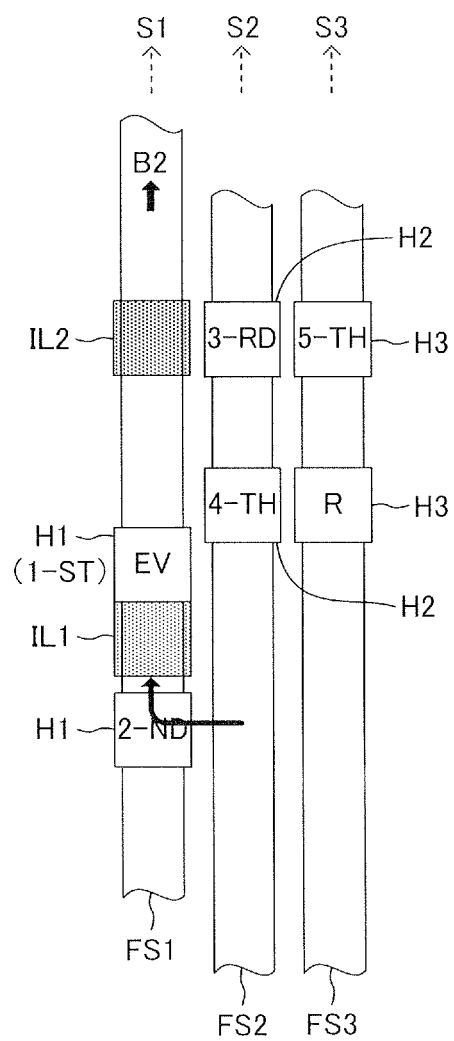
FIG. 9 is a diagram corresponding to FIG. 2 in a state in which the position for 1-st is selected.

When the shift lever SL moves from the "N position" to the "shift completion position for 1-st" (via the 1-2 selection position) (when the lock mechanism G is in the unlock state) as shown in FIGS. 8 and 9, the inner lever IL1 of the S&S shaft drives the "EV-side engagement portion" of the shift head H1 connected to the fork shaft FS1 in the "1-st" direction (upward in FIG. 9) by the distance B2, whereby only the fork shaft FS1 (i.e., the sleeve S1) moves to the "position for 1-st." The sleeves S2 and S3 are located at the respective "neutral positions."

In this state, as shown in FIG. 8, the sleeve S1 engages with the idle gear G1o and fixes the idle gear G1o to the output shaft Ao such that the idle gear G1o cannot rotate relative to the output shaft Ao. Also, the idle gear G1o is always meshed with a fixed gear G1i fixed to the input shaft Ai. As a result, as indicated by a thick continuous line in FIG. 8, in addition to the power transmission system between the motor generator M/G and the output shaft Ao, a power transmission system corresponding to "1-st" is established between the input shaft Ai and the output shaft Ao through the gears G1i and G1o. Namely, in the case where "1-st" is selected (by bringing the lock mechanism G into the unlock state), there is realized a state (namely, the above-mentioned "HV travel") in which the vehicle travels by utilizing both the EG torque transmitted through the clutch Ca and the MG torque. Moreover, in the case where EV travel cannot be performed normally, the driver can start the vehicle by utilizing the EG torque only.

Figure 10:
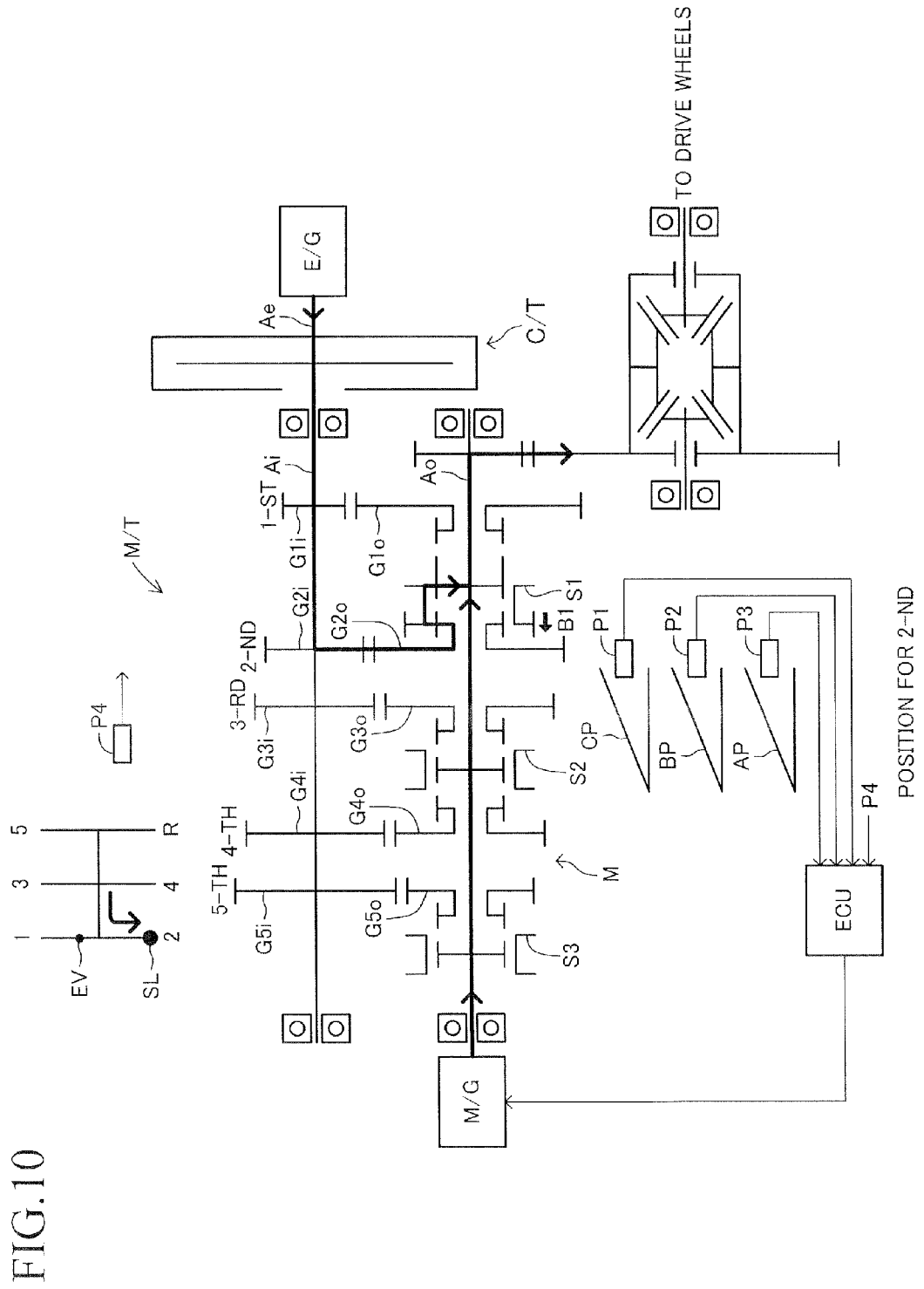
FIG. 10 is a diagram corresponding to FIG. 1 in a state in which a position for 2-nd is selected.
Figure 11:
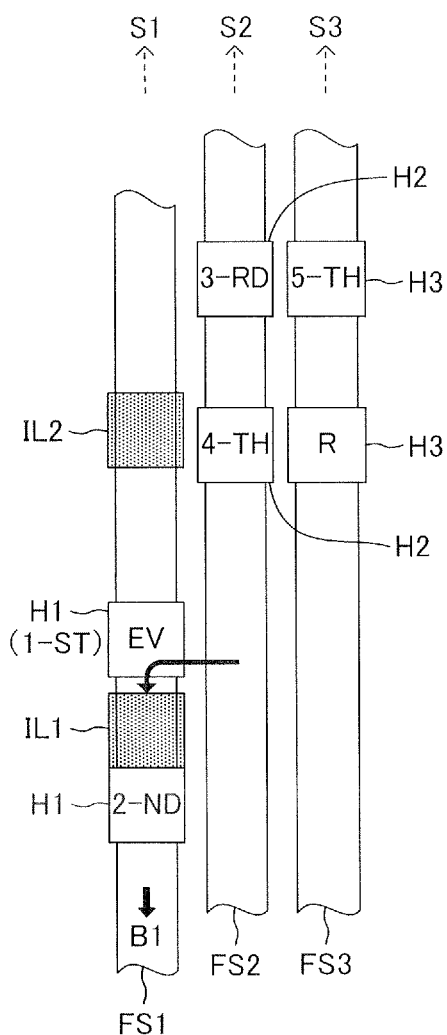
FIG. 11 is a diagram corresponding to FIG. 2 in a state in which the position for 2-nd is selected.
Figure 12:
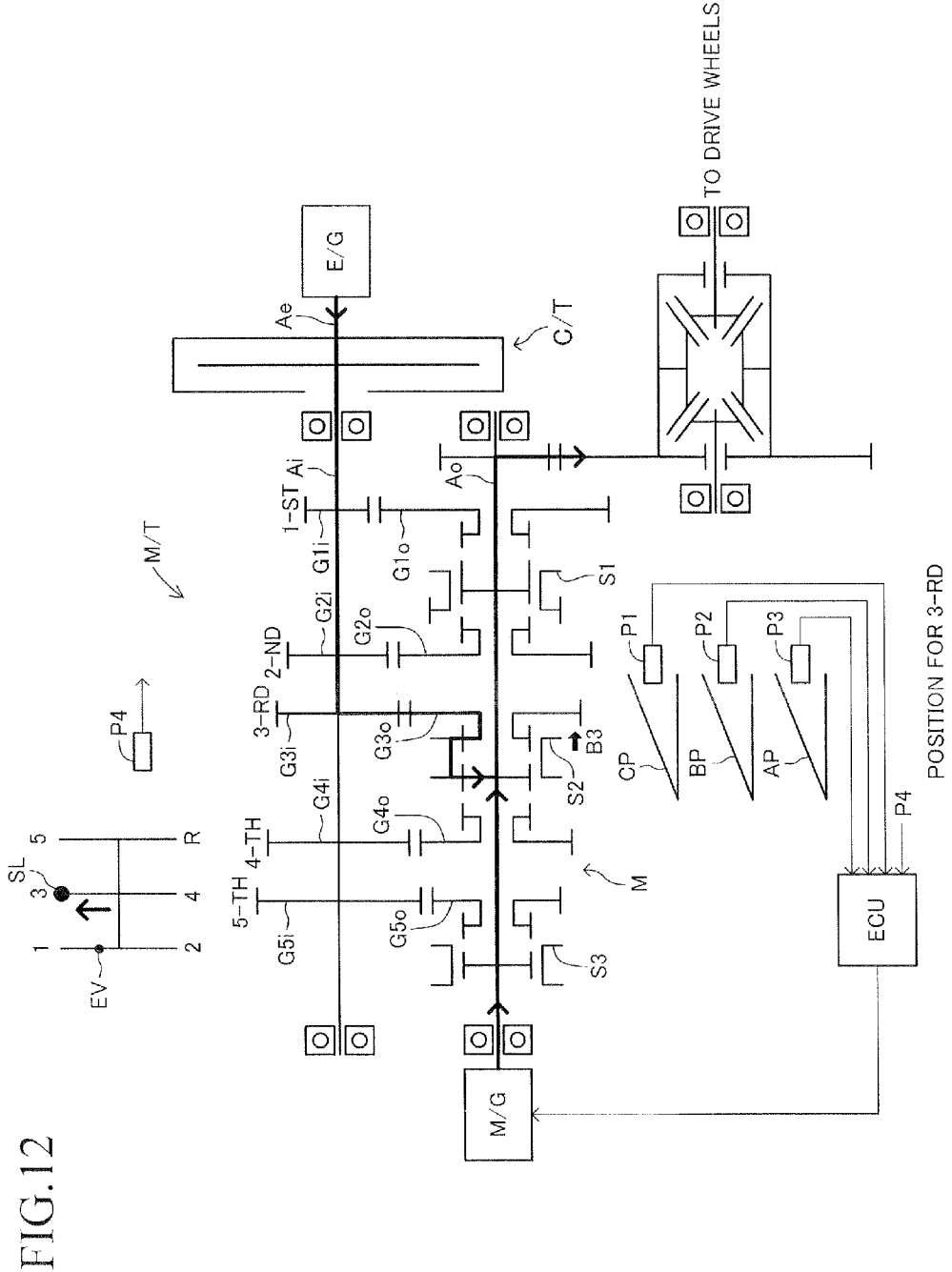
FIG. 12 is a diagram corresponding to FIG. 1 in a state in which a position for 3-rd is selected.
Figure 13:
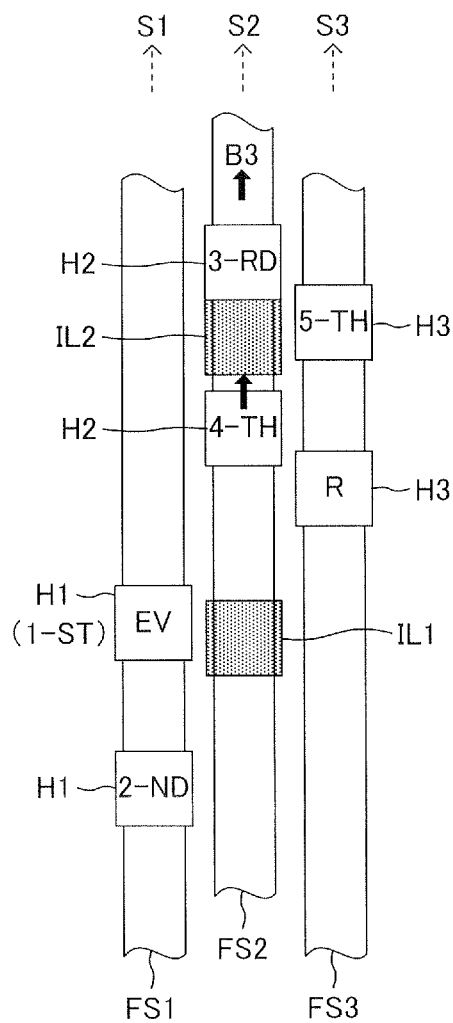
FIG. 13 is a diagram corresponding to FIG. 2 in a state in which the position for 3-rd is selected.
Figure 14:
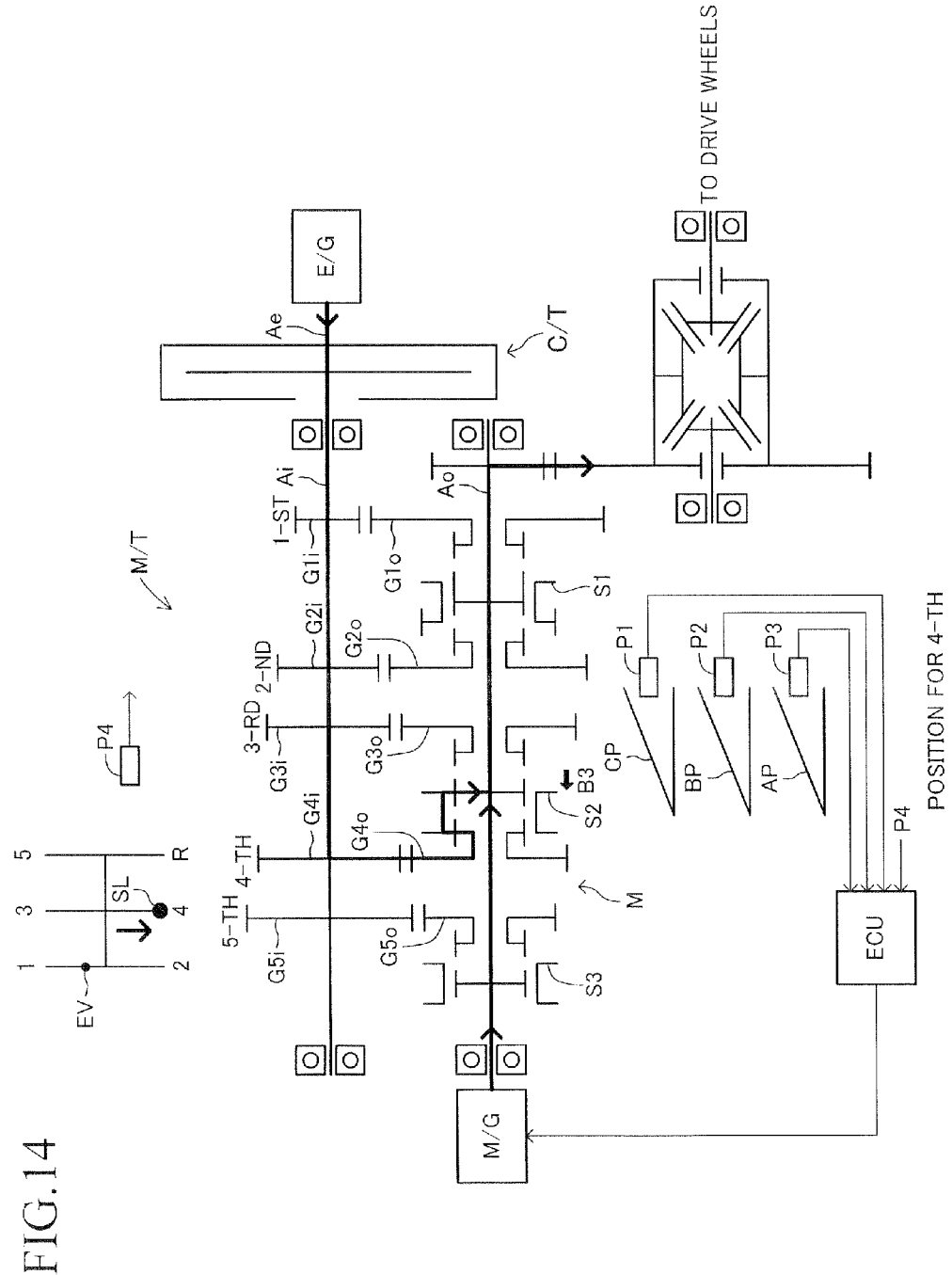
FIG. 14 is a diagram corresponding to FIG. 1 in a state in which a position for 4-th is selected.
Figure 15:
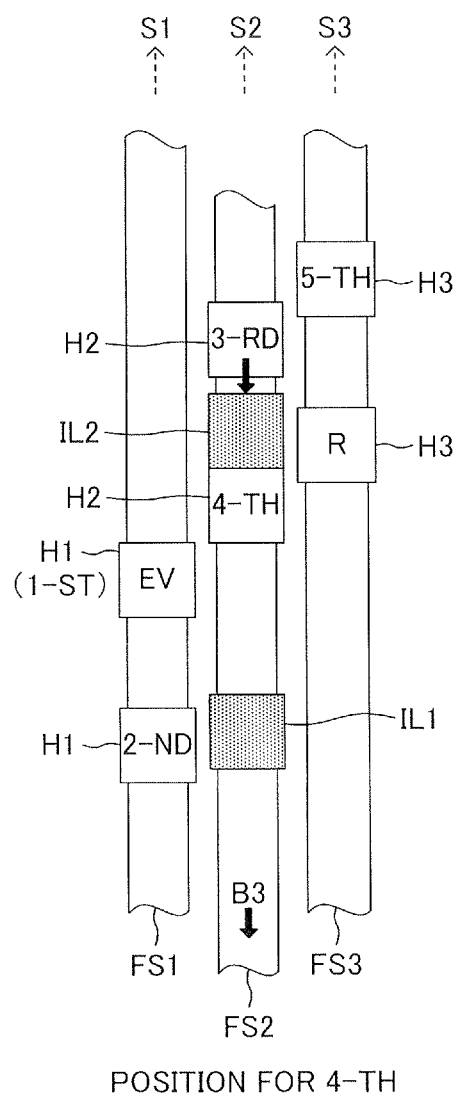
FIG. 15 is a diagram corresponding to FIG. 2 in a state in which the position for 4-th is selected.
Figure 16:
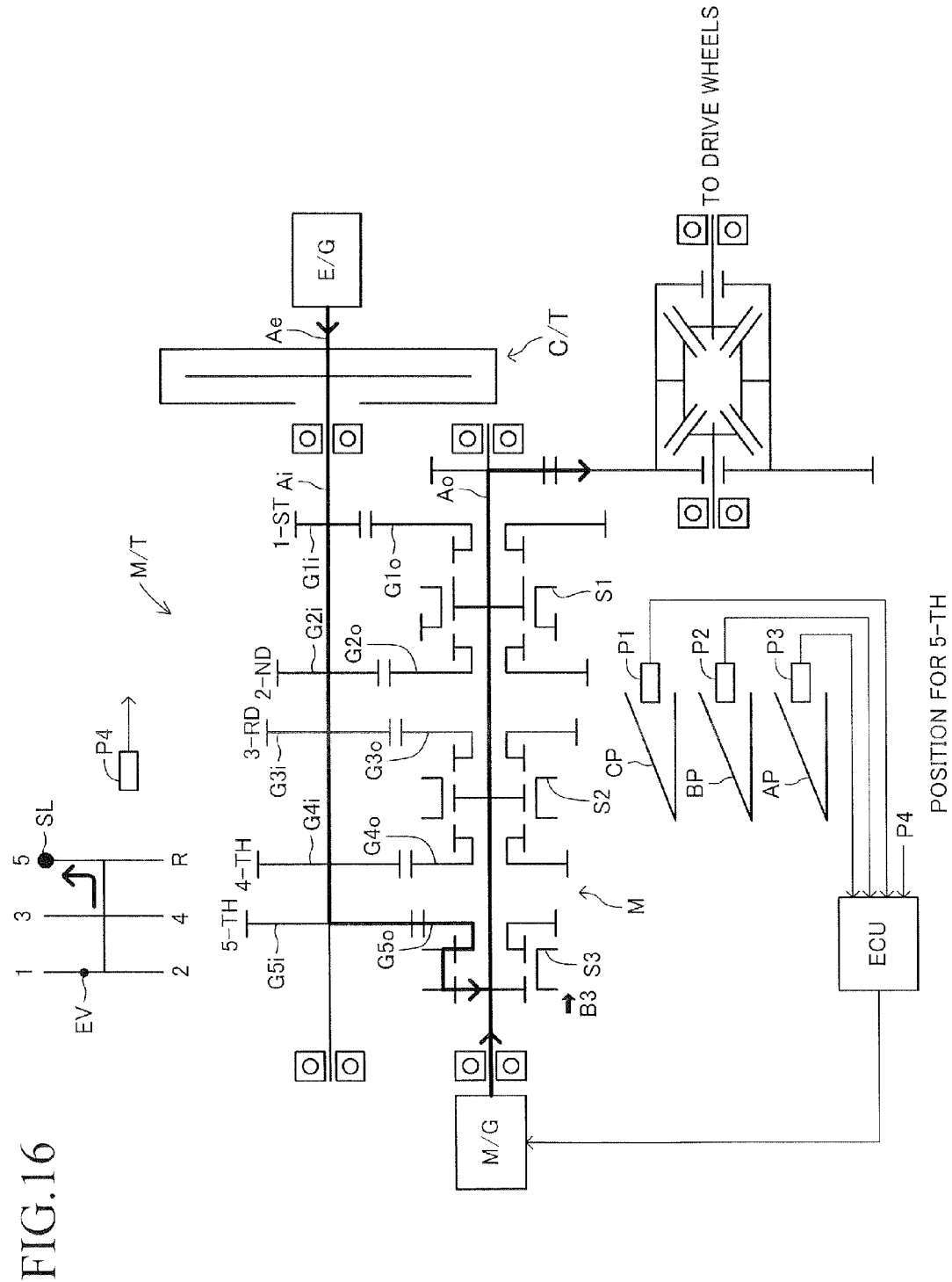
FIG. 16 is a diagram corresponding to FIG. 1 in a state in which a position for 5-th is selected.
Figure 17:
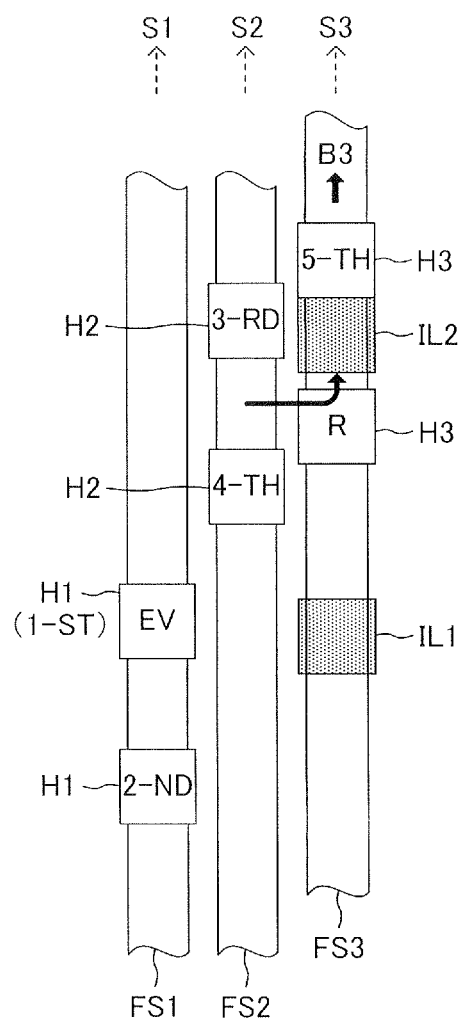
FIG. 17 is a diagram corresponding to FIG. 2 in a state in which the position for 5-th is selected.

When the shift lever SL moves from the "N position" to the "shift completion position for 2-nd" (via the 1-2 selection position) as shown in FIGS. 10 and 11, the inner lever IL1 of the S&S shaft drives a "2-nd-side engagement portion" of the shift head H1 connected to the fork shaft FS1 in the "2-nd" direction (downward in FIG. 11) by the distance B1, whereby only the fork shaft FS1 (i.e., the sleeve S1) moves to the "position for 2-nd." The sleeves S2 and S3 are located at the respective "neutral positions."

In this state, the sleeve S1 engages with an idle gear G2o and fixes the idle gear G2o to the output shaft Ao such that the idle gear G2o cannot rotate relative to the output shaft Ao. Also, the idle gear G2o is always meshed with a fixed gear G2i fixed to the input shaft Ai. As a result, as indicated by a thick continuous line in FIG. 10, in addition to the power transmission system between the motor generator M/G and the output shaft Ao, a power transmission system corresponding to "2-nd" is established between the input shaft Ai and the output shaft Ao through the gears G2i and G2o. Namely, in the case where "2-nd" is selected, the above-mentioned "HV travel" is realized.

As shown in FIGS. 12 to 17, in the case where the shift lever SL is located at the shift completion position for "3-rd," "4-th," or "5-th" as well, as in the case where the shift lever SL is located at the shift completion position for "2-nd," the above-mentioned "HV travel" is realized. Namely, when the shift lever SL is moved to the shift completion position for "3-rd" ("4-th," "5-th"), in addition to the power transmission system between the motor generator M/G and the output shaft Ao, a power transmission system corresponding to "3-rd" ("4-th," "5-th") is established between the input shaft Ai and the output shaft Ao through gears G3i and G3o (G4i and G4o, G5i and G5o). Notably, for the system for transmitting the EG torque, the "ratio of the rotational speed of the input shaft Ai to that of the output shaft Ao" will be referred to as an "MT speed reduction ratio." The MT speed reduction ratio (the number of teeth of GNo/the number of teeth of GNi) (N: 1 to 5) decreases gradually from "1-st" toward "5-th."

(Control of the Engine E/G)

The control of the engine E/G by the present apparatus is generally performed as follows. When the vehicle is stopped or "N" or "EV" is selected, the engine E/G is maintained in a stopped state (a state in which fuel injection is not performed). When a gear stage for HV travel (any of "1-st" to "5-th") is selected in a state in which the engine E/G is stopped, the engine E/G is started (fuel injection is started). In periods during which the engine E/G is operating (fuel injection is being performed), the EG torque is controlled on the basis of the accelerator opening, etc. When "N" or "EV" is selected or the vehicle stops in a state the engine E/G is operating, the engine E/G is again maintained in the stopped state.

(Control of the Motor Generator M/G)

The control of the motor generator M/G by the present apparatus is generally performed as follows. When the vehicle is stopped or "N" is selected, the motor generator M/G is maintained in a stopped state (the MG torque=0). When "EV" is selected in a state in which the motor generator M/G is in the stopped state, normal start control utilizing the MG torques is started. In the normal start control, the MG torque is controlled on the basis of the accelerator opening and the clutch stroke. The MG torque in the normal start control is determined by making use of a map or the like which is previously prepared for the case where an "ordinary vehicle which includes a manual transmission and a friction clutch and which includes an internal combustion engine only as a power source" is started in "1-st" and which defines the relation between "accelerator opening and clutch stroke" and "torque of the internal combustion engine transmitted to the input shaft of the manual transmission via the clutch" at the time of start of the vehicle. After completion of the normal start control, the MG torque is controlled on the basis of the accelerator opening, etc. when "EV" is selected or one of "2-nd" to "5-th" (the plurality of gear stages for HV travel). When the vehicle stops, the motor generator M/G is again maintained in the stopped state.

(Action and Effects)

As described above, in the manual transmission MIT according to the embodiment of the present invention, on the shift pattern (H pattern), "the shift completion position for EV" is disposed at a position through which the shift lever passes during a "shift operation" (operation in the front-rear direction of the vehicle) from the "1-2 selection position" to the "shift completion position for 1-st" (see FIG. 5). Accordingly, when the driver selects "EV," like the case where the driver selects "1-st," the driver merely moves shift lever SL to the "1-2 selection position" by a "selection operation" (operation in the left-right direction of the vehicle) and then moves the shift lever SL from the "1-2 selection position" to the "shift completion position for 1-st" by the "shift operation." Accordingly, the driver is less likely to become confused in the operation of the shift lever SL.

In addition, this manual transmission M/T has a lock mechanism G which is selectively brought into the "lock state" or the "unlock state" by the driver. Accordingly, in the case where the driver determines that EV travel is performed normally, the driver can select the "lock state." As a result, it is possible to prevent arising of a situation in which when the driver tries to move the shift lever SL from the "selection position for 1-st" to the "shift completion position for EV" so as to start the vehicle by using MG torque only, the driver accidentally moves the shift lever SL from the "selection position for 1-st" to the "shift completion position for 1-st." Meanwhile, in the case where the driver determines that EV travel cannot be performed normally, the driver can select the "unlock state." As a result, when the driver starts the vehicle by utilizing the EG torque only, the driver can move shift lever SL from the "selection position for 1-st" to the "shift completion position for 1-st" without fail.

The present invention is not limited to the above-described embodiment, and various modifications may be employed without departing from the scope of the present invention. For example, in the above-described embodiment, all the sleeves S1, S2, and S3 are provided on the input shaft Ai. However, all the sleeves S1, S2, and S3 may be provided on the output shaft Ao. Alternatively, some of the sleeves S1, S2, and S3 may be provided on the output shaft Ao, and the remaining sleeve(s) may be provided on the input shaft Ai.

In the above-described embodiment, the axial positions of the sleeves S1 to S3 are mechanically adjusted in accordance with the shift position of the shift lever SL by making use of a link mechanism (the S&S shaft and the fork shafts) or the like which mechanically connects the shift lever SL and the sleeves S1 to S3. However, the axial positions of the sleeves S1 to S3 may be electrically adjusted by making use of drive force of an actuator which operates on the basis of the result of detection by the shift position sensor P4 (so-called by-wire scheme).

Figure 18:
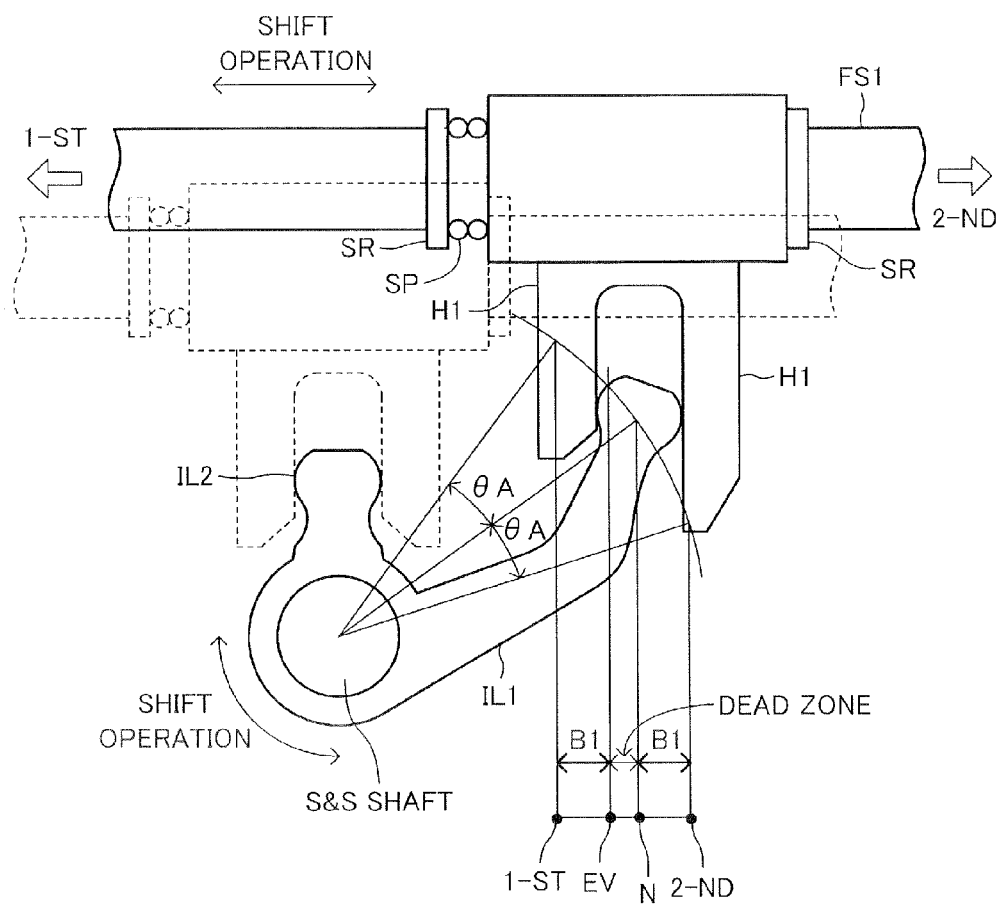
FIG. 18 is a view corresponding to FIG. 3 and showing a modification of the embodiment of the invention.

In the above-described embodiment, the specific shift head H1 is fixedly connected to the specific fork shaft FS1 (see FIG. 3). However, as shown in FIG. 18, the specific shift head H1 may be movably connected to the specific fork shaft FS1 by making use of two snap rings SR fixed to the fork shaft FS1 and a single spring SP. In this case, when the engagement portion of the inner lever IL1 drives the fork shaft FS1 from the neutral position in the leftward direction in FIG. 18, the shift head H1 can move in the axial direction by a "predetermined distance" relative to the fork shaft FS1; and when the engagement portion of the inner lever IL1 drives the fork shaft FS1 from the neutral position in the rightward direction in FIG. 18, the shift head H1 cannot move in the axial direction relative to the fork shaft FS1.

Figure 19:
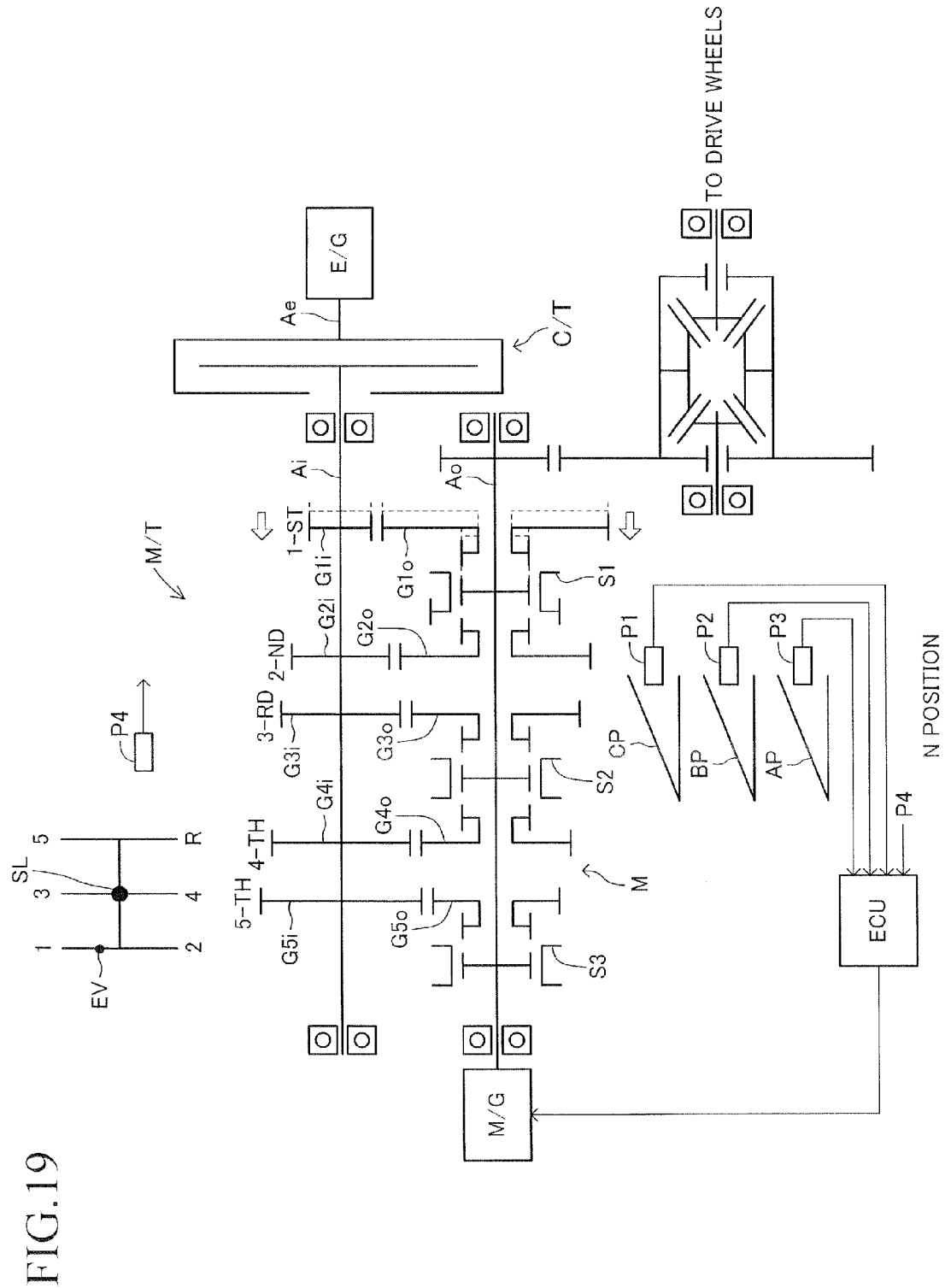
FIG. 19 is a diagram corresponding to FIG. 1 and showing the modification of the embodiment of the invention.
Figure 20:
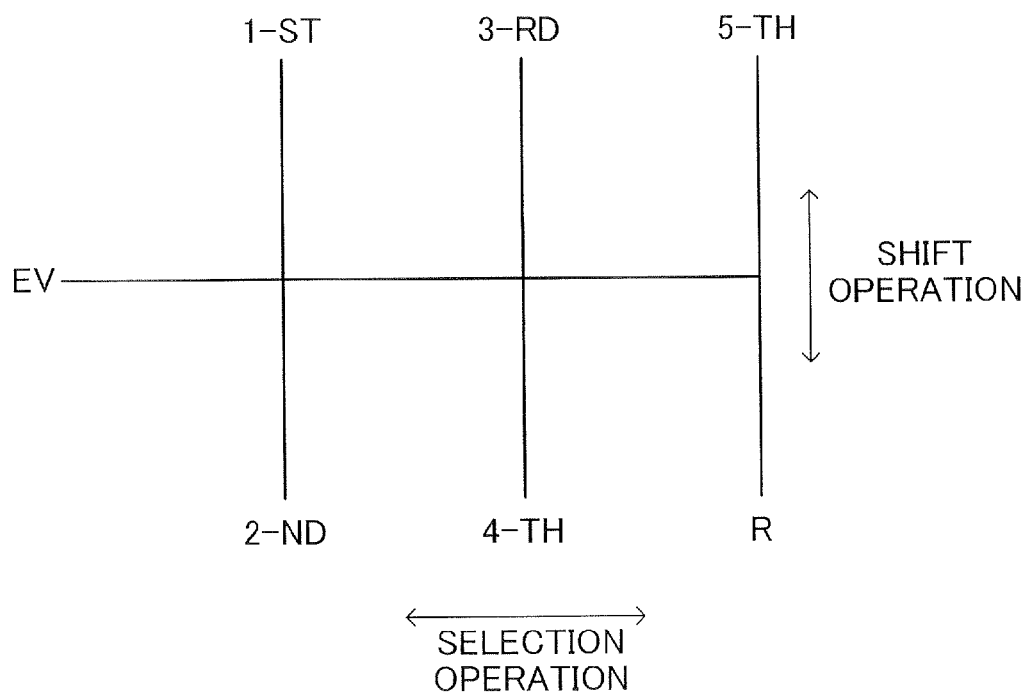
FIG. 20 is a diagram showing an example of a conventional shift pattern in the case where an H pattern is employed and both "EV" and "1-st" are provided.

The above-mentioned "predetermined distance" corresponds to a "dead zone" shown in FIG. 18. Preferably, the width of this "dead zone" is set to (B2−B1) (for B1 and B2, see FIG. 3). With this setting, even when the shift lever SL is moved from the "1-2 selection position" to the "shift completion position for EV," the fork shaft FS1 (the sleeve S1) is not driven, and the axial position of the fork shaft FS1 (the sleeve S1) is maintained at the neutral position. When the shift lever SL is further moved from the "shift completion position for EV" to the "shift completion position for 1-st," the fork shaft FS1 (the sleeve S1) is driven. Namely, the rotation angle of the inner lever IL1 from the reference position in the case where the S&S shaft rotates in the counterclockwise direction is the same (θA) as that in the case where the S&S shaft rotates in the clockwise direction, the amount of axial movement of the fork shaft FS1 (i.e., the sleeve S1) in the former case can be made equal to that in the latter case; i.e., the distance B1. As a result, as indicated by a white arrow in FIG. 19, the entire range of axial movement of the fork shaft FS1 (the sleeve S1) can be narrowed by (B2−B1). This contributes to reduction in the size of the housing of the transmission and reduction in the weight of the housing due to the reduced size.

The invention claimed is:

1. A manual transmission (M/T) having no torque converter, which is applied to a vehicle including an internal combustion engine (E/G) and an electric motor (M/G) as power sources and which is configured such that an operation of a shift operation member (SL) operated by a driver in order to establish each of a plurality of gear stages is achieved by moving the shift operation member on a shift pattern to a corresponding selection position by a selection operation, which is an operation in a left-right direction of the vehicle, and then moving the shift operation member from the corresponding selection position to a corresponding shift completion position by a shift operation, which is an operation in a front-rear direction of the vehicle, the manual transmission comprising:
- an input shaft (Ai) to which power is input from the internal combustion engine;
- an output shaft (Ao) to which power is input from the electric motor and from which power is output to a drive wheel of the vehicle; and
- a transmission speed change mechanism (M) which operates, when the driver moves the shift operation member on the shift pattern to each of the shift completion positions corresponding to the plurality of gear stages (1-st to 5-th), so as to establish a power transmission system between the input shaft and the output shaft such that a transmission speed reduction ratio, which is the ratio of rotational speed of the input shaft to that of the output shaft, is set to a value corresponding to a corresponding gear stage, the transmission speed change mechanism being configured such that no power transmission system is established between the input shaft and the output shaft when the shift operation member is moved on the shift pattern to a shift completion position corresponding to a gear stage for motor travel (EV) for traveling by using only drive force of the electric motor without using drive force of the internal combustion engine,
- wherein the shift completion position corresponding to the gear stage for motor travel (EV) is disposed at a position on the shift pattern through which the shift operation member passes during a shift operation from a selection position corresponding to 1-st which is the greatest in transmission speed reduction ratio among the plurality of gear stages (1-st to 5-th) toward a shift completion position for 1-st.

2. A manual transmission according to claim 1, wherein the transmission speed change mechanism includes a lock mechanism (G) which selectively realizes a lock state and an unlock state and which can select, as a state to be realized, the lock state or the unlock state in accordance with an operation of the driver, the lock state being a state in which when the shift operation from the selection position corresponding to 1-st toward the shift completion position for 1-st is performed, the shift operation member can move from the selection position corresponding to 1-st to the shift completion position corresponding to the gear stage for motor travel but cannot move from the shift completion position corresponding to the gear stage for motor travel to the shift completion position for 1-st, and the unlock state being a state in which when the shift operation from the selection position corresponding to 1-st toward the shift completion position for 1-st is performed, the shift operation member can move from the selection position corresponding to 1-st to the shift completion position for 1-st.

3. A manual transmission according to claim 1, wherein
- on the shift pattern, the shift completion position for 1-st is disposed at a position deviated from the selection position corresponding to 1-st toward the front side of the vehicle, and the shift completion position for 2-nd which is smaller in transmission speed reduction ratio than 1-st is disposed at a position deviated from the selection position corresponding to 1-st toward the rear side of the vehicle; and
- the transmission speed change mechanism comprises:
- a shift and selection shaft which is axially moved by the selection operation of the shift operation member and is rotated about its axis by the shift operation of the shift operation member and which has a specific inner lever (IL1) projecting from a side surface of the shift and selection shaft, the rotational position of the shift and selection shaft moving to a first position (position for EV) deviated from a reference position by a first angle when the shift operation member is moved on the shift pattern from the selection position corresponding to 1-st to the shift completion position for the gear stage for motor travel (EV), moving from the reference position to a second position (position for 1-st) located on the same side as the first position in relation to the reference position and deviated from the reference position by a second angle (θA) greater than the first angle when the shift operation member is moved on the shift pattern from the selection position corresponding to 1-st to the shift completion position for 1-st, and moving from the reference position to a third position (position for 2-nd) located on the side opposite the second position in relation to the reference position and deviated from the reference position by the second angle (θA) when the shift operation member is moved on the shift pattern from the selection position corresponding to 1-st to the shift completion position for 2-nd;
- a specific sleeve (S1) which is non-rotatably and axially movably provided on one shaft of the input shaft and the output shaft and which can be selectively engaged with an idle gear (G1o) for 1-st or an idle gear (G2o) for 2-nd rotatably provided on the one shaft so as to selectively fix the idle gear (G1o) for 1-st or the idle gear (G2o) for 2-nd to the one shaft such that the idle gear (G1o) for 1-st or the idle gear (G2o) for 2-nd cannot rotate relative to the one shaft;
- a specific fork shaft (FS1) which is connected to the specific sleeve and which drives the specific sleeve in the axial direction thereof by moving in the axial direction; and
- a first adjustment mechanism (H1, IL1) which adjusts the state of engagement between an engagement portion of the specific inner lever and the specific fork shaft, the first adjustment mechanism being configured such that when the rotational position of the shift and selection shaft moves from the reference position to the first position, the engagement portion of the specific inner lever drives the specific fork shaft in the axial direction such that the axial position of the specific fork shaft moves from a neutral position to a position (position for EV) deviated from the neutral position in one direction by a first distance and such that the specific sleeve engages with none of the idle gear for 1-st and the idle gear for 2-nd; when the rotational position of the shift and selection shaft moves from the reference position to the second position, the engagement portion of the specific inner lever drives the specific fork shaft in the axial direction such that the axial position of the specific fork shaft moves from the neutral position to a position (position for 1-st) deviated from the neutral position in the one direction by a second distance (B2) larger than the first distance and the specific sleeve engages with the idle gear for 1-st, and when the rotational position of the shift and selection shaft moves from the reference position to the third position, the engagement portion of the specific inner lever drives the specific fork shaft in the axial direction such that the axial position of the specific fork shaft moves from the neutral position to a position (position for 2-nd) deviated from the neutral position in the direction opposite the one direction by a third distance (B1) smaller than the second distance and the specific sleeve engages with the idle gear for 2-nd.

4. A manual transmission according to claim 3, wherein
the shift and selection shaft and the specific fork shaft are disposed such that they extend orthogonally to each other but do not intersect each other; and
the first adjustment mechanism is realized by a structure in which
when viewed in the axial direction of the shift and selection shaft in a state in which the rotational position of the shift and selection shaft coincides with the reference position, the engagement portion of the specific inner lever (IL1) is located on a straight line which passes through the rotation center of the shift and selection shaft and inclines by a predetermined angle ($\theta z$) in relation to a perpendicular which extends from the rotation center toward the specific fork shaft; and
the engagement portion of the specific inner lever engages with a recess portion of a specific shift head (H1) integrally connected to the specific fork shaft and drives the specific fork shaft in the axial direction.

5. A manual transmission according to claim 1, wherein
on the shift pattern, the shift completion position for 1-st is disposed at a position deviated from the selection position corresponding to 1-st toward the front side of the vehicle, and the shift completion position for 2-nd which is smaller in transmission speed reduction ratio than 1-st is disposed at a position deviated from the selection position corresponding to 1-st toward the rear side of the vehicle; and
the transmission speed change mechanism comprises:
a shift and selection shaft which is axially moved by the selection operation of the shift operation member and is rotated about its axis by the shift operation of the shift operation member and which has a specific inner lever (IL1) projecting from a side surface of the shift and selection shaft, the rotational position of the shift and selection shaft moving to a first position (position for EV) deviated from a reference position by a first angle when the shift operation member is moved on the shift pattern from the selection position corresponding to 1-st to the shift completion position for the gear stage for motor travel (EV), moving from the reference position to a second position (position for 1-st) located on the same side as the first position in relation to the reference position and deviated from the reference position by a second angle ($\theta A$) greater than the first angle when the shift operation member is moved on the shift pattern from the selection position corresponding to 1-st to the shift completion position for 1-st, and moving from the reference position to a third position (position for 2-nd) located on the side opposite the second position in relation to the reference position and deviated from the reference position by the second angle ($\theta A$) when the shift operation member is moved on the shift pattern from the selection position corresponding to 1-st to the shift completion position for 2-nd;
a specific sleeve (S1) which is non-rotatably and axially movably provided on one shaft of the input shaft and the output shaft and which can be selectively engaged with an idle gear (G1o) for 1-st or an idle gear (G2o) for 2-nd rotatably provided on the one shaft so as to selectively fix the idle gear (G1o) for 1-st or the idle gear (G2o) for 2-nd to the one shaft such that the idle gear (G1o) for 1-st or the idle gear (G2o) for 2-nd cannot rotate relative to the one shaft;
a specific fork shaft (FS1) which is connected to the specific sleeve and which drives the specific sleeve in the axial direction thereof by moving in the axial direction; and
a second adjustment mechanism (H1, IL1, SP, SR) which adjusts the state of engagement between an engagement portion of the specific inner lever and the specific fork shaft, the second adjustment mechanism being configured such that when the rotational position of the shift and selection shaft moves from the reference position to the first position, the engagement portion of the specific inner lever does not drive the specific fork shaft in the axial direction, the axial position of the specific fork shaft is maintained in the neutral position, and the specific sleeve engages with none of the idle gear for 1-st and the idle gear for 2-nd; when the rotational position of the shift and selection shaft moves from the first position to the second position, the engagement portion of the specific inner lever drives the specific fork shaft in the axial direction such that the axial position of the specific fork shaft moves from the neutral position to a position (position for 1-st) deviated from the neutral position in one direction by a fourth distance (B1) and the specific sleeve engages with the idle gear for 1-st; and when the rotational position of the shift and selection shaft moves from the reference position to the third position, the engagement portion of the specific inner lever drives the specific fork shaft in the axial direction such that the axial position of the specific fork shaft moves from the neutral position to a position (position for 2-nd) deviated from the neutral position in the direction opposite the one direction by the fourth distance (B1) and the specific sleeve engages with the idle gear for 2-nd.

6. A manual transmission according to claim 5, wherein
the shift and selection shaft and the specific fork shaft are disposed such that they extend orthogonally to each other but do not intersect each other; and
the second adjustment mechanism is realized by a structure in which
when viewed in the axial direction of the shift and selection shaft in a state in which the rotational position of the shift and selection shaft coincides with the reference position, the engagement portion of the specific inner lever (IL1) is located on a straight line which passes through the rotation center of the shift and selection shaft and inclines by a predetermined angle ($\theta z$) in relation to a perpendicular which extends from the rotation center toward the specific fork shaft;
the engagement portion of the specific inner lever engages with a recess portion of a specific shift head (H1) connected to the specific fork shaft and drives the specific fork shaft in the axial direction; and
the specific shift head is connected to the specific fork shaft in such a manner that when the engagement portion of the specific inner lever drives the specific fork shaft from the neutral position in the one direction, the specific shift head can move relative to the specific fork shaft in the one direction by a predetermined distance (B2-B1), and when the engagement portion of the specific inner lever drives the specific fork shaft from the neutral position in the direction opposite the one direction, the specific shift head cannot move relative to the specific fork shaft.

* * * * *